US012790677B2

(12) United States Patent
Patel et al.

(10) Patent No.: US 12,790,677 B2
(45) Date of Patent: Nov. 10, 2026

(54) MANUFACTURING OF WEAR RESISTANT COATINGS

(71) Applicants: Pratt & Whitney Canada Corp., Longueuil (CA); Concordia University, Montreal (CA); The Royal Institution for the Advancement of Learning/McGill University, Montreal (CA)

(72) Inventors: Payank Patel, Montreal (CA); Mary E. Makowiec, Manchester, CT (US); Joël Larose, Longueuil (CA); Navid Sharifi, Verdun (CA); Pantcho P. Stoyanov, Beaconsfield (CA); Christian Moreau, Boucherville (CA); Richard Chromik, Montreal (CA)

(73) Assignees: Pratt & Whitney Canada Corp., Longueuil (CA); Concordia University, Montreal (CA); The Royal Institution for the Advancement of Learning/McGill University, Montreal (CA)

( * ) Notice: Subject to any disclaimer, the term of this patent is extended or adjusted under 35 U.S.C. 154(b) by 159 days.

(21) Appl. No.: 18/738,609

(22) Filed: Jun. 10, 2024

(65) Prior Publication Data

US 2024/0410046 A1 Dec. 12, 2024

Related U.S. Application Data

(60) Provisional application No. 63/472,262, filed on Jun. 9, 2023.

(51) Int. Cl.

| | |
|---|---|
| ***C23C 4/073*** | (2016.01) |
| ***C22C 30/00*** | (2006.01) |
| ***C23C 4/129*** | (2016.01) |
| ***F01D 11/00*** | (2006.01) |

(52) U.S. Cl.

CPC .............. *C23C 4/073* (2016.01); *C22C 30/00* (2013.01); *C23C 4/129* (2016.01); *F01D 11/003* (2013.01);

(Continued)

(58) Field of Classification Search

CPC ......... C23C 4/073; C23C 4/129; C22C 30/00; F01D 11/003; F05D 2240/11;

(Continued)

(56) References Cited

U.S. PATENT DOCUMENTS

| | | | |
|---|---|---|---|
| 5,866,518 | A | 2/1999 | DellaCorte et al. |
| 8,753,417 | B1 | 6/2014 | DellaCorte et al. |

(Continued)

FOREIGN PATENT DOCUMENTS

| | | | |
|---|---|---|---|
| CN | 104561878 | A | 4/2015 |
| CN | 113930754 | A | 1/2022 |

(Continued)

OTHER PUBLICATIONS

Yan Cui et al., "Wear Resistance of FeCoCrNiMnAlx High-Entropy Alloy Coatings at High Temperature", Applied Surface Science, May 15, 2020, Elsevier, Amsterdam, the Netherlands.

(Continued)

*Primary Examiner* — Gilbert Y Lee
(74) *Attorney, Agent, or Firm* — Bachman and LaPointe, PC

(57) ABSTRACT

A seal has: a metallic substrate; and a coating layer, The coating layer has in atomic percent of all metals in the coating layer: 6.5 to 22.0 Al; 14.0 to 23.0 Fe; 14.0 to 23.0 Co; 14.0 to 23.0 Cr; 14.0 to 23.0 Mn; and 14.0 to 23.0 Ni. The coating may be applied by high velocity oxy-fuel (HVOF) spray.

23 Claims, 13 Drawing Sheets

(52) U.S. Cl.
CPC .... *F05D 2230/311* (2013.01); *F05D 2230/90* (2013.01); *F05D 2240/11* (2013.01); *F05D 2300/175* (2013.01); *F05D 2300/611* (2013.01)

(58) Field of Classification Search
CPC ........... F05D 2230/311; F05D 2230/90; F05D 2230/175; F05D 2230/611; F16J 9/26
See application file for complete search history.

(56) References Cited

U.S. PATENT DOCUMENTS

| | | | |
|---|---|---|---|
| 11,643,939 B2 | 5/2023 | Stoyanov et al. | |
| 2015/0307968 A1* | 10/2015 | Mars | C22C 19/07 219/76.1 |
| 2020/0318737 A1 | 10/2020 | Stoyanov et al. | |
| 2021/0147967 A1* | 5/2021 | Cao | C22C 38/04 |
| 2021/0156007 A1 | 5/2021 | Chen et al. | |
| 2021/0270369 A1 | 9/2021 | Harrington et al. | |
| 2022/0065122 A1 | 3/2022 | Stoyanov et al. | |

FOREIGN PATENT DOCUMENTS

| | | |
|---|---|---|
| CN | 114032489 A | 2/2022 |
| CN | 114231882 A | 3/2022 |
| CN | 114369786 A | 4/2022 |
| CN | 114411081 A | 4/2022 |
| CN | 111763904 B | 11/2022 |
| CN | 115418595 A | 12/2022 |
| CN | 112553564 B | 1/2023 |

OTHER PUBLICATIONS

Yang et al., "Electroplasticity in the Al0.6CoCrFeNiMn High Entropy Alloy Subjected to Electrically-Assisted Uniaxial Tension", Journal of Materials Science & Technology, Jun. 10, 2023, pp. 209-221, Elsevier, Amsterdam, the Netherlands.

He et al., "Effects of AI Addition on Structural Evolution and Tensile Properties of the FeCoNiCrMn High Entropy Alloy System", Aca Materialia 62, Jan. 2014, pp. 105-113, Elsevier, Amsterdam, the Netherlands.

Luo et al., "Tribological Behavior of High Entropy Alloy Coatings: A Review", Coatings, Sep. 29, 2022, MDPI, Basel, Switzerland.

Tian et al., "Microstructure and Wear Behavior of Atmospheric Plasma-Sprayed AlCoCrFeNiTi High-Entropy Alloy Coating", Journal of Materials Engineering and Performance, December, Oct. 18, 2016, pp. 5513-5521, vol. 25, ASM International, Materials Park, Ohio.

Xiao et al., "Microstructure and Wear Behavior of FeCoNiCrMn High Entropy Alloy Coating Deposited by Plasma Spraying", Surface & Coatings Technology, Jan. 31, 2020, Elsevier, Amsterdam, the Netherlands.

Lobel et al., "Microstructure and Wear Behavior of the High-Velocity-Oxygen-Fuel Sprayed and Spark Plasma Sintered High-Entropy Alloy AlCrFeCoNi", Advanced Engineering Materials, Dec. 23, 2020, Wiley-VCH GmbH, Weinheim, Germany.

Patel et al., "Microstructural and Tribological Behavior of Thermal Spray CrMnFeCoNi High Entropy Alloy Coatings", Journal of Thermal Spray Technology, Apr. 2022, pp. 1285-1301, Springer, Berlin, Germany.

Li et al., "Subsonic-Flame-Sprayed CoCrFeNi, AlCoCrFeNi and MnCoCrFeNi-Based High-Entropy Alloy Coatings and Their Tribological Behaviors", Journal of Thermal Spray Technology, Nov. 23, 2022, pp. 96-110, Springer, Berlin, Germany.

Li et al., "A Low-Cost Second Generation Single Crystal Superalloy DD6", Superalloys 2000, Jan. 2000, pp. 777-783, TMS (The Minerals, Metals & Materials Society), Pittsburgh, Pennsylvania.

European partial search report dated Oct. 4, 2024 for European Patent Application No. 24181087.8.

Extended European Search Report dated Jan. 3, 2025 for European Patent Application No. 24181087.8.

* cited by examiner

HVOF Ex. 4

HVOF FeCoCrMnNi (Prior Art)

Uncoated DD6
(Prior Art)

HVOF Ex. 4

Uncoated DD6
(Prior Art)

MANUFACTURING OF WEAR RESISTANT COATINGS

CROSS-REFERENCE TO RELATED APPLICATION

Benefit is claimed of U.S. Patent Application No. 63/472,262, filed Jun. 9, 2023, and entitled “Manufacturing of Wear Resistant Coatings”, the disclosure of which is incorporated by reference herein in its entirety as if set forth at length.

BACKGROUND

The disclosure relates to gas turbine engines. More particularly, the disclosure relates to coatings for hot section piston seal rings (PSR).

Gas turbine engines (used in propulsion and power applications and broadly inclusive of turbojets, turboprops, turbofans, turboshafts, industrial gas turbines, and the like) use piston seal rings (PSR) in a variety of locations.

Coatings produced by different thermal spray techniques are being used in a wide variety of applications. They can perform different functions such as thermal barriers, abradable, corrosion and wear resistant and, for each application, different strategies and choices of materials can be used to achieve the different properties desired for the target application. When high temperature conditions are involved, the protection against wear and corrosion in elevated temperatures becomes a main engineering challenge, because oxidation and the attack by corrosive elements combined with friction and mechanical wear can damage the materials exposed to those conditions, leading to premature failure of engineered parts.

Currently, superalloy (e.g., IN718) static seals are commonly used uncoated in turbine engine hot sections and may be subject to damage by hot corrosion. Effects of hot corrosion often are reflected in weight/mass gain. Bare superalloys may have a weight gain up to 25 $mg/cm^2$ when exposed to hot corrosion conditions such as 0.5 $mg/cm^2$ of $Na_2SO_4$ at 900° C. for 24 hours. Such high weight gain means that the alloy is being attacked by sulfur, which could lead to premature failure of the seal and mating counterface component. Furthermore, these parts are also exposed to severe tribological conditions, which means they suffer premature wear during high temperature operation.

Conventional Ni- and Co-based alloys (e.g., IN718, Mar-M-247, PWA1484 and PW1480) are being widely used in the aerospace industry, however, have shown some limitations when operating in demanding service conditions. The failure of such components is commonly attributed to surface phenomena such as friction, wear, oxidation, and corrosion. The development of coatings to gas turbine engine tribological interfaces can provide protection against friction and wear, corrosion, high thermal residual stresses, local heating, or oxidation etc., which can significantly improve the performance with diminished operating costs.

The use of commercially available self-lubricating coatings can increase the lifetime of these parts by improving tribological performance. However, these self-lubricating coatings (such as the NASA-developed PS304 and PS400) have shown poor resistance to hot corrosion conditions. PS304 is disclosed in U.S. Pat. No. 5,866,518 of DellaCorte et al., entitled “Self-Lubricating Composite Chromium Oxide, issued Feb. 2, 1999. PS304 generally has NiCr binder with $Cr_2O_3$ hardener and Ag+ fluorides solid lubricant. PS400 is disclosed in U.S. Pat. No. 8,753,417 of DellaCorte et al., entitled “High Temperature Solid Lubricant Coating for High Temperature Wear Applications”, issued Jun. 17, 2014.PS400 generally has NiMoAl binder with $Cr_2O_3$ hardener and Ag+ fluorides solid lubricant.

A more recent proposal for a coating for such a PSR is found in US Patent Application Publication 2021/0270369A1 (the ’369 publication), of Stoyanov et al., entitled “Wear Resistant Self-Lubricating Static Seal”, published Jan. 6, 2022, the disclosure of which is incorporated by reference herein in its entirety as if set forth at length.

Another seal configuration is the W-seal of which an example is found in US Patent Application Publication 2022/0065122A1 (the ’122 publication) of Stoyanov et al., entitled “Seals and Methods of Making Seals”, published Mar. 3, 2022, the disclosure of which is incorporated by reference herein in its entirety as if set forth at length. The ’122 publication discloses both PSR and self-sprung compression seals. The self-sprung compression seals have cross-sections characterized by one or more cycles of a C-shape or W-shape. With such seals, sometimes because of seal orientation a different letter may be used (e.g., the letter E may be used to designate a radially compressed seal; whereas, the letter W may be used to designate an axially-compressed seal of similar cross-section but oriented 90° opposite). The ’122 publication discloses both baseline seals made of conventional alloys (e.g., nickel-based superalloys) and modified seals made of HEA.

High entropy alloy (HEA) materials have been proposed for substrate use and as coatings wear coatings for tribological interfaces. Typical HEA have the same atomic percentages of each of their components and such alloys are also known as equiatomic multicomponent alloys. Departures from nominal equiatomic content are often identified with a decimal subscript for the element departing from equiatomic so that $Al_xCoCrFeNi$ would have nominally equiatomic Co, Cr, Fe, and Ni content and x times that content of Al.

Xiao et al. identifies FeCoNiCrMn coatings. Xiao et al., “Microstructure and wear behavior of FeCoNiCrMn high entropy alloy coating deposited by plasma spraying”, *Surface and Coatings Technology*, February, 385(February), Elsevier BV, Amsterdam, Netherlands.

Löbel et al. identifies HVOF AlCrFeCoNi HEA coatings of essentially equal atomic percentages. Löbel et al., “Microstructure and Wear Behavior of the High-Velocity-Oxygen-Fuel Sprayed and Spark Plasma Sintered High-Entropy Alloy AlCrFeCoNi”, *Advanced Engineering Materials*, Dec. 23, 2020, Vol. 23(4), Wiley-VCH GmbH, Weinheim, Germany.

Tian et al. identifies AlCoCrFeNiTi HEA coatings of essentially equal atomic percentages. Tian et al., “Microstructure and Wear Behavior of Atmospheric Plasma-Sprayed AlCoCrFeNiTi High-Entropy Alloy Coating”, *Journal of Materials Engineering and Performance*, Oct. 18, 2016, pp. 5513-5521, Vol. 25(12), ASM International, Materials Park, Ohio.

He et al. identifies arc melt-remelt production of $Al_xFeCoNiCrMn$. He et al., “Effects of Al addition on structural evolution and tensile properties of the FeCoNiCrMn high-entropy alloy system”, *Acta Materialia*, January 2014, Volume 62, pp. 105-113, Elsevier BV, Amsterdam, Netherlands.

Yang et al. identifies vacuum induction melted $Al_{0.6}CoCrFeNiMn$. Yang et al., “Electroplasticity in the $Al_{0.6}CoCrFeNiMn$ high entropy alloy subjected to electrically-assisted uniaxial tension”, *Journal of Materials Sci-*

*ence & Technology*, Jun. 10, 2023 (online availability Jan. 14, 2023), Volume 148, Pages 209-221, Elsevier BV, Amsterdam, Netherlands.

Cui et al. identifies $Al_x$FeCoCrNiMn laser clad coatings. Cui et al., "Wear resistance of FeCoCrNiMnAl, high-entropy alloy coatings at high temperature", *Applied Surface Science*, May 15, 2020, Volume 512, 145736, Elsevier BV, Amsterdam, Netherlands. Specifically it reports microhardness values of about 248 for $Al_{0.5}$FeCoCrNiMn laser clad coating and 344 for $Al_{0.75}$FeCoCrNiMn laser clad coating.

Li et al. discusses tribological properties of flame-sprayed HEA. Li et al., "Subsonic-Flame-Sprayed CoCrFeNi, AlCoCrFeNi and MnCoCrFeNi-Based High-Entropy Alloy Coatings and Their Tribological Behaviors", J Therm Spray Tech, Nov. 23, 2023, Volume 32, pp. 96-110, Springer Nature, Berlin, Germany.

Patel et al disclose HVOF CrMnFeCoNi coatings. Payank Patel et al., Microstructural and Tribological Behavior of Thermal Spray CrMnFeCoNi High Entropy Alloy Coatings", *Journal of Thermal Spray Technology*, April 2022, Volume 31, Issue 4, p. 1285-1301 Springer Nature Switzerland AG, Cham, Switzerland (hereafter Patel et al., the disclosure of which is incorporated by reference herein in its entirety as if set forth at length).

SUMMARY

One aspect of the disclosure involves a seal comprising: a metallic substrate, optionally forming a split ring or a full annulus; and a coating layer. The coating layer comprises in atomic percent of all metals in the coating layer: 6.5 to 22.0 Al; 14.0 to 23.0 Fe; 14.0 to 23.0 Co; 14.0 to 23.0 Cr; 14.0 to 23.0 Mn; and 14.0 to 23.0 Ni.

In a further embodiment of any of the foregoing embodiments, additionally and/or alternatively, the coating layer comprises in overall atomic percent: at least 15.0 O.

In a further embodiment of any of the foregoing embodiments, additionally and/or alternatively, the coating layer comprises by atomic percent of all metals in the coating layer: no more than 1.0 other individually and 5.0 other total.

In a further embodiment of any of the foregoing embodiments, additionally and/or alternatively, the substrate is a nickel- or cobalt-based alloy based alloy.

In a further embodiment of any of the foregoing embodiments, additionally and/or alternatively, the coating layer has a thickness of at least 50 micrometers.

In a further embodiment of any of the foregoing embodiments, additionally and/or alternatively, the coating layer is an outermost layer.

In a further embodiment of any of the foregoing embodiments, additionally and/or alternatively, the coating layer comprises in atomic percent of all metals in the coating layer: 12.0 to 22.0 Al; 14.0 to 22.0 Fe; 14.0 to 22.0 Co; 14.0 to 22.0 Cr; 14.0 to 22.0 Mn 14.0 to 22.0 Ni; and no more than 1.0 other individually and 5.0 other total.

In a further embodiment of any of the foregoing embodiments, additionally and/or alternatively, the substrate has a bellows section; and the coating layer is at least on axial ends of the bellows section.

In a further embodiment of any of the foregoing embodiments, additionally and/or alternatively, the seal is a split ring and the coating layer is at least on an outer diameter surface of the substrate.

In a further embodiment of any of the foregoing embodiments, additionally and/or alternatively, the seal is a finger seal; and the coating layer is at least on contact face of the substrate.

In a further embodiment of any of the foregoing embodiments, additionally and/or alternatively, a gas turbine engine includes the seal and further comprises: one or more compressor sections; a combustor; one or more turbine sections; and a gaspath passing through the one or more compressor sections, the combustor section, and the one or more turbine sections, said seal sealing between relatively nonrotating components.

In a further embodiment of any of the foregoing embodiments, additionally and/or alternatively, the gas turbine engine further comprises a counterface engaging the coating and comprising uncoated nickel- or cobalt-based alloy.

In a further embodiment of any of the foregoing embodiments, additionally and/or alternatively, a method for manufacturing the seal comprises spraying powder to form the coating layer.

In a further embodiment of any of the foregoing embodiments, additionally and/or alternatively, the spraying is HVOF, HVAF, or cold spray.

In a further embodiment of any of the foregoing embodiments, additionally and/or alternatively, the spraying is HVOF.

In a further embodiment of any of the foregoing embodiments, additionally and/or alternatively, the method further comprises: forming the powder by blending an aluminum-based powder with an HEA powder; and thermally diffusing the blend.

In a further embodiment of any of the foregoing embodiments, additionally and/or alternatively, A method for using the seal of claim 1, the method comprising: engaging the coating layer with a counterface; and subjecting the seal and counterface to relative sliding movement.

In a further embodiment of any of the foregoing embodiments, additionally and/or alternatively, the engaging comprises compressing.

A further aspect of the disclosure involves a method for coating a seal. The seal comprises a metallic substrate forming a split ring or a full annulus. The method comprises HVOF spraying a powder to the substrate to form a coating layer. The powder comprises by atomic percent: 6.5 to 22.0 Al; 14.0 to 23.0 Fe; 14.0 to 23.0 Co; 14.0 to 23.0 Cr 14.0 to 23.0 Mn; and 14.0 to 23.0 Ni.

In a further embodiment of any of the foregoing embodiments, additionally and/or alternatively, the powder comprises by atomic percent: no more than 1.0 other individually and 5.0 other total.

In a further embodiment of any of the foregoing embodiments, additionally and/or alternatively: the substrate has shape to form a split ring seal and the spraying is to an outer diameter surface of the substrate; or the substrate has shape to form an axial spring seal and the spraying is to axial end surfaces of the substrate; the substrate has shape to form a finger seal and the spraying is to a contact surface of the substrate; or the substrate has shape to form a radial spring seal and the spraying is to radial end surfaces of the substrate; or the substrate has shape to form a HALO seal and the spraying is to an inner diameter surface of the substrate.

A further aspect of the disclosure involves a method for coating an article, the article comprising: a metallic substrate, the method comprising: blending an Al-based powder with a high entropy alloy powder of Fe, Co, Cr, Mn, and Ni thermally diffusing the blended powders; and HVOF spraying the diffused powders atop the substrate to form a coating layer.

In a further embodiment of any of the foregoing embodiments, additionally and/or alternatively, the blend comprises by atomic percent: 6.5 to 22.0 Al; 14.0 to 23.0 Fe; 14.0 to 23.0 Co; 14.0 to 23.0 Cr 14.0 to 23.0 Mn; and 14.0 to 23.0 Ni.

In a further embodiment of any of the foregoing embodiments, additionally and/or alternatively, the blend comprises by atomic percent: no more than 1.0 other individually and 5.0 other total.

In a further embodiment of any of the foregoing embodiments, additionally and/or alternatively: the substrate has shape to form a split ring seal and the spraying is to an outer diameter surface of the substrate; or the substrate has shape to form an axial spring seal and the spraying is to axial end surfaces of the substrate; or the substrate has shape to form a finger seal and the spraying is to a contact surface of the substrate; or the substrate has shape to form a radial spring seal and the spraying is to radial end surfaces of the substrate; or the substrate has shape to form a HALO seal and the spraying is to an inner diameter surface of the substrate; or the substrate has shape to form a locating pin and the spraying is to a base of the locating pin or a distal end section of the locating pin; or the substrate interfaces with a locating pin and the spraying is to a counterface surface for the locating pin; or the substrate has shape to form a snap fastener and the spraying is to a shaft and a barb underside; or the substrate has shape to form a component having a snap fit bead or groove and the spraying is to said bead or groove; or the substrate has shape to form a component having a tab and the spraying is to a face of the tab; or the substrate has shape to form a component having a seal counterface and the spraying is to the seal counterface.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
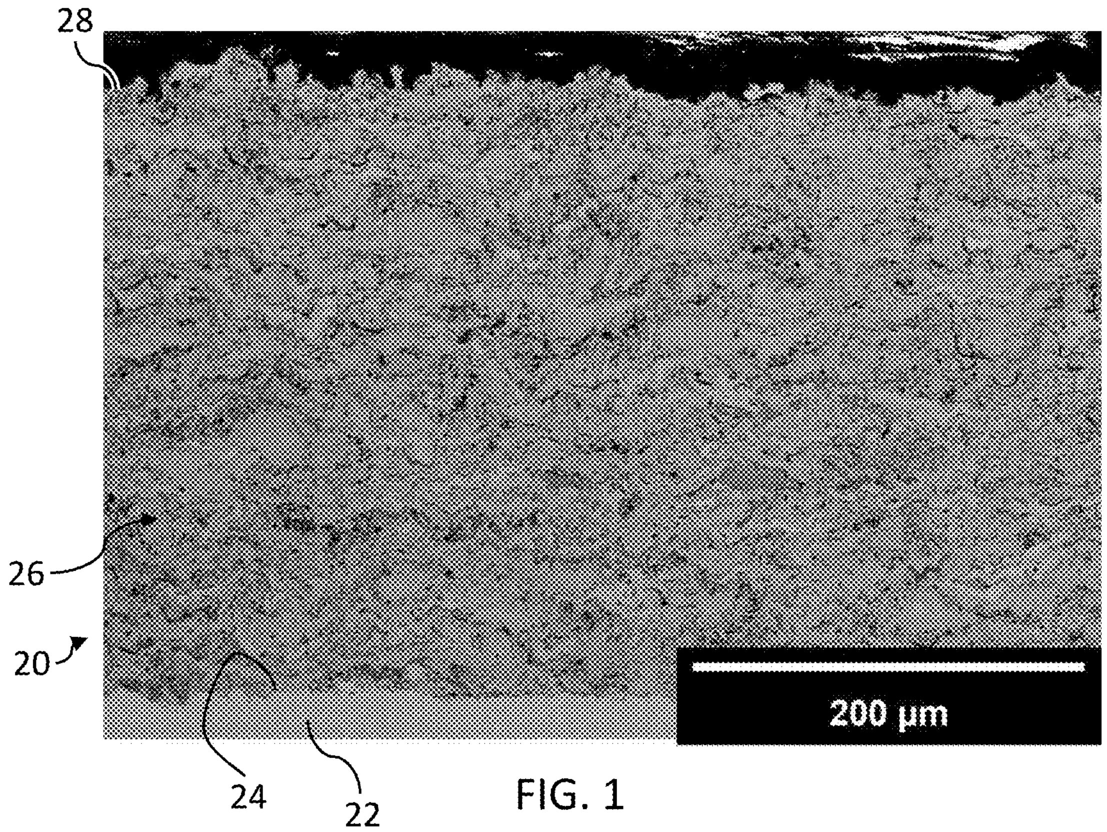
FIG. 1 is a micrograph of an HVOF AlFeCoCrNiMn coated substrate.
Figure 1A:
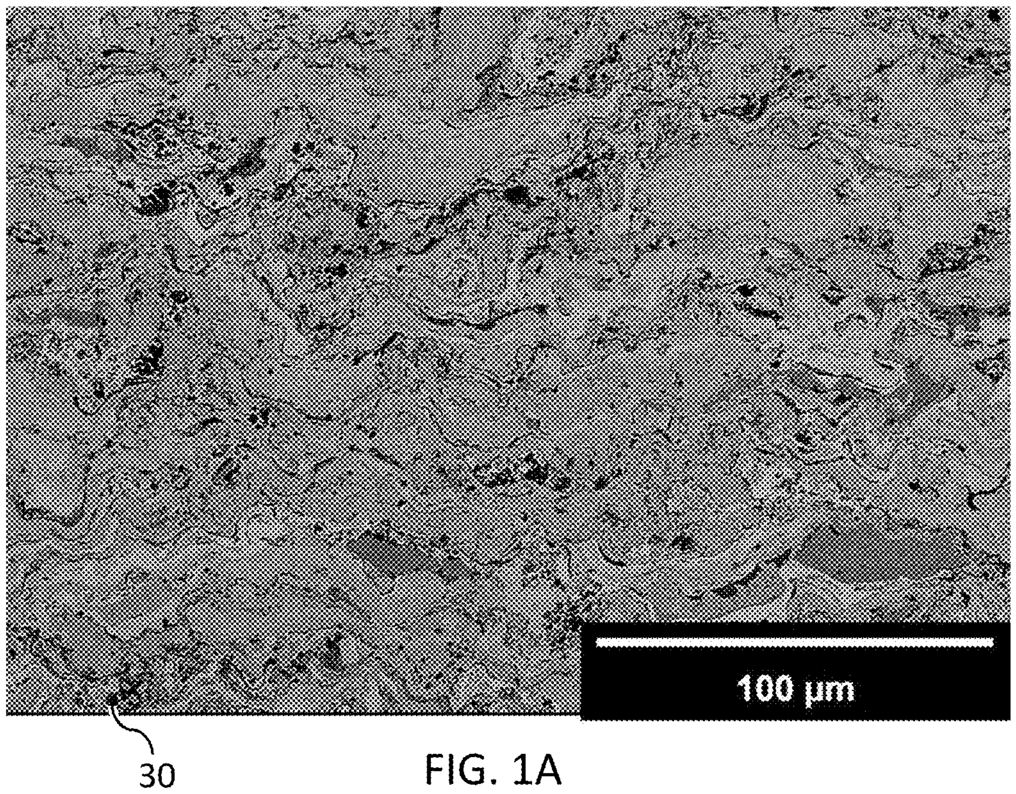
FIG. 1A is an enlarged view of the micrograph of FIG. 1.

As is discussed further below, AlFeCoCrMnNi (approximate) HEA was deposited by high velocity oxy fuel (HVOF) spray. The example powder feedstock was obtained by blending a vendor-sourced nominal FeCoCrMnNi with a vendor-sourced aluminum powder. The vendor-sourced powder composition was estimated as the average value of the three readings (one EDS area analysis and two-point analyses) as 20.85 Cr, 20.36 Fe, 19.46 Co, 19.06 Ni, 20.27 Mn. The Al powder was analyzed via average of three EDS readings as 99.53 Al, 0.19 Fe, 0.19 Si, and 0.08 Cu. These represent truncated measurements and accuracy is lower than the illustrated two decimal places. The first blend was a 90-10 blend of the HEA to Al by weight. An additional 95-5 blend was also made.

Table 1 below shows HVOF deposition parameters used for testing on HEA coatings (using a Diamond Jet™ 2700 gun of Oerlikon Metco, Pfaeffikon, Switzerland):

TABLE 1

| | |
|---|---|
| Feed rate | 23 g/min |
| Oxygen | 303.5 LPM |
| Propylene | 78.8 LPM |
| Air | 421.8 LPM |
| Spraying distance | 150 mm |
| Transverse speed' | 1 m/s |
| Deposition efficiency achieved | ~80% |
| Thickness | 350 μm (after 30 passes) |
| Substrate temperature | 250-300° C. (with IR camera) |

Table 2 below shows feedstock blends of elemental powders for the HEA:

TABLE 2

| HEA Powder | | | | | | | |
|---|---|---|---|---|---|---|---|
| | Element (Atomic Percent) | | | | | | |
| | Al | Fe | Co | Cr | Mn | Ni | Other |
| Ex.1 | 16.67 | 16.67 | 16.67 | 16.67 | 16.67 | 16.67 | |
| Ex.2 | 9.1 | 18.2 | 18.2 | 18.2 | 18.2 | 18.2 | † |
| Ex. 3 | 7.0 | 18.6 | 18.6 | 18.6 | 18.6 | 18.6 | † |
| Ex. 4 | 17.18 | 16.60 | 15.73 | 17.83 | 16.87 | 15.79 | |
| Ex. 5 | 9.40 | 18.16 | 17.21 | 19.50 | 18.46 | 17.28 | |
| Range 1A | 6.5 to 22.0 | 14.0 to 23.0 | 14.0 to 23.0 | 14.0 to 23.0 | 14.0 to 23.0 | 14.0 to 23.0 | †† |
| Range 1B | 7.0 to 21.0 | 15.0 to 20.0 | 15.0 to 20.0 | 15.0 to 20.0 | 15.0 to 20.0 | 15.0 to 20.0 | †† |
| Range 1C | 8.5 to 19.5 | 15.5 to 19.5 | 15.5 to 19.5 | 15.5 to 19.5 | 15.5 to 19.5 | 15.5 to 19.5 | †† |
| Range 1D | 9.0 to 18.5 | 15.5 to 19.5 | 15.5 to 19.5 | 15.5 to 19.5 | 15.5 to 19.5 | 15.5 to 19.5 | †† |
| Range 2A | 12.0 to 22.0 | 14.0 to 22.0 | 14.0 to 22.0 | 14.0 to 22.0 | 14.0 to 22.0 | 14.0 to 22.0 | †† |
| Range 2B | 14.0 to 22.0 | 15.0 to 20.0 | 15.0 to 20.0 | 15.0 to 20.0 | 15.0 to 20.0 | 15.0 to 20.0 | †† |
| Range 2C | 14.0 to 21.0 | 15.5 to 19.0 | 15.5 to 19.0 | 15.5 to 19.0 | 15.5 to 19.0 | 15.5 to 19.0 | †† |
| Range 2D | 15.5 to 19.0 | 15.5 to 19.0 | 15.5 to 19.0 | 15.5 to 19.0 | 15.5 to 19.0 | 15.5 to 19.0 | †† |
| Range 2E | 15.5 to 18.0 | 15.5 to 18.0 | 15.5 to 18.0 | 15.5 to 18.0 | 15.5 to 18.0 | 15.5 to 18.0 | †† |
| Range 3A | 8.5 to 9.7 | 17.0 to 19.0 | 17.0 to 19.0 | 17.0 to 19.0 | 17.0 to 19.0 | 17.0 to 19.0 | †† |
| Range 3B | 8.5 to 9.5 | 17.2 to 19.0 | 17.2 to 19.0 | 17.2 to 19.0 | 17.2 to 19.0 | 17.2 to 19.0 | †† |

† Impurities only

†† ≤5.0 other elements total; ≤1.0 other elements individually

Example 1 corresponds to nominal AlFeCoCrNiMn. Example 2 corresponds to nominal $Al_{0.5}FeCoCrNiMn$. Example 3 corresponds to nominal $Al_{0.37}FeCoCrNiMn$.

Figure 11:
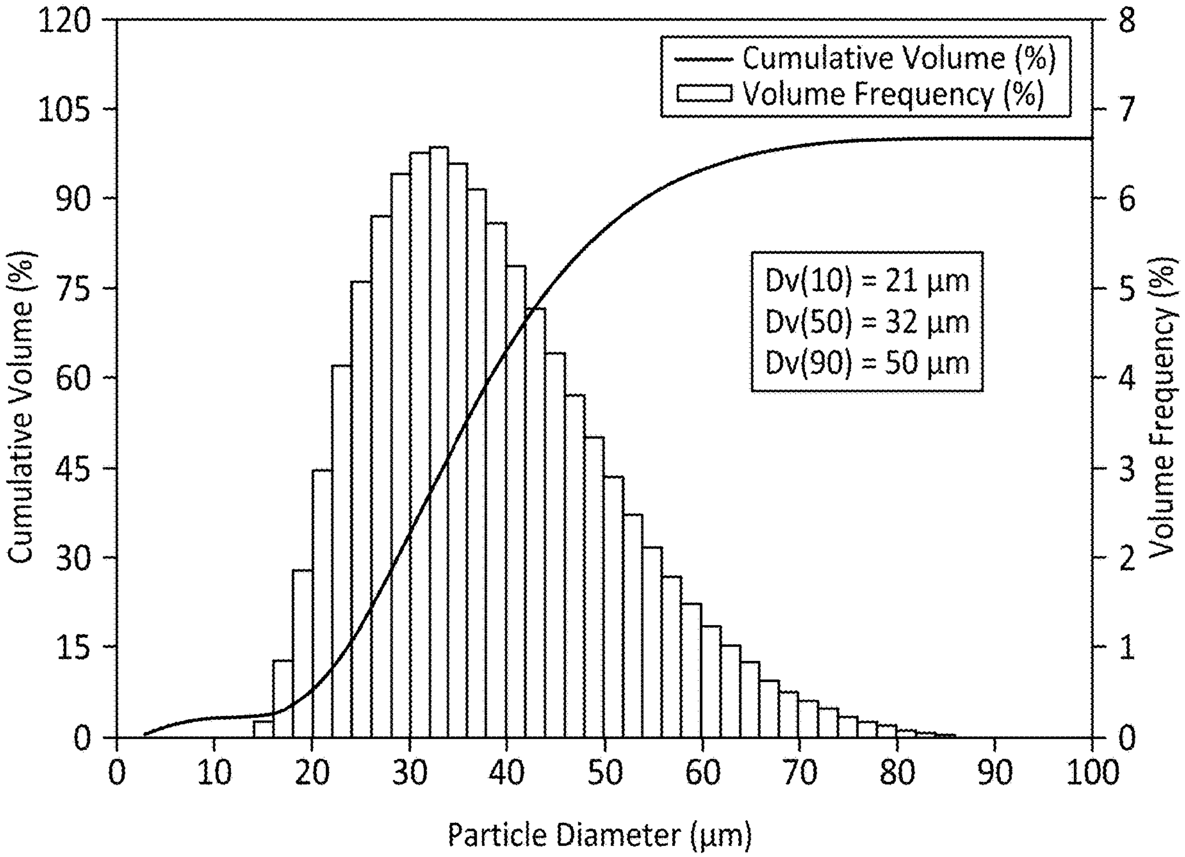
FIG. 11 is a size distribution plot for ground Al-diffused HEA powder.
Figure 12:
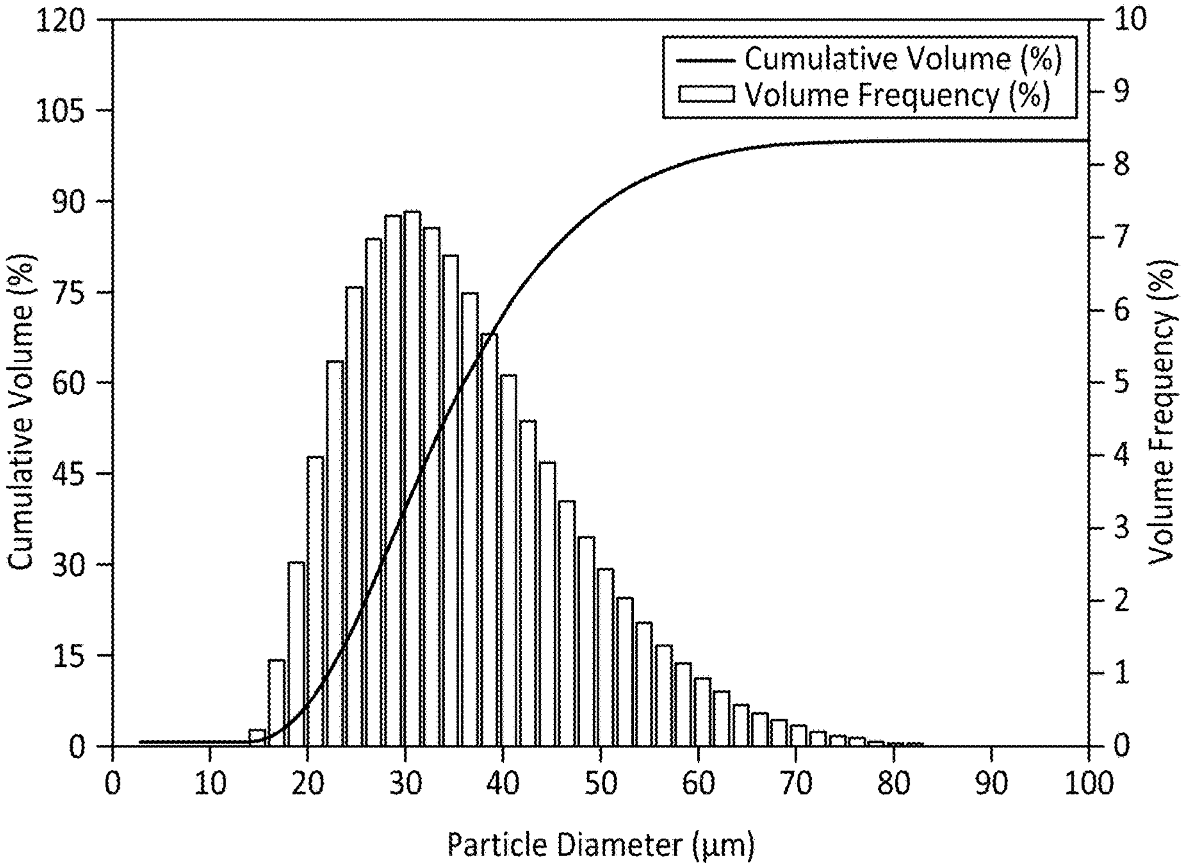
FIG. 12 is a size distribution plot for FeCoCrNiMn powder.

Example 4 is a tested higher-Al HEA (the 90-10 blend mentioned above). Example 5 is a lower-Al HEA (the 95-5 blend mentioned above). The Ex 4 and 5 compositions were calculated based on sampling vendor feedstock FeCrMnCoNi particles by averaging one EDS area analysis and two point analyses and then factoring in the added aluminum. They are shown truncated to two decimal places although measurement precision is much coarser As is discussed, Example 4 HEA was deposited by high velocity oxy fuel (HVOF) spray. The example powder feedstock was obtained by blending a vendor-sourced nominal FeCoCrMnNi with an aluminum powder noted above. The Ex. 4 blend was selected to achieve approximate equal atomic percent of aluminum to the other five HEA components. The blend was diffused at temperature (900° C. for ten hours). The diffused powder somewhat agglomerated, so it was broken down (ground) with a mortar and pestle. The ground diffused Ex. 4 powder had a relatively smooth unimodal distribution of Dv(10)=21 micrometers; Dv(50)=32 micrometers; Dv(90)=50 micrometers (see FIG. 11). This is quite similar to the source FeCoCrMnNi of FIG. 12. The example diffusion did not fully homogenize the Ex. 4 powder but left a substantial variation in particle-to-particle composition. However, the Ex. 5 blend showed even less compositional uniformity/diffusion. Ex. 5 was not spray tested.

Table 3 shows the composition for three randomly selected particles of the diffused Ex. 4 feedstock. Measurements were taken at three randomly selected locations on each particle and averaged. The final table row merely averages the first three:

TABLE 3

| Diffused Feedstock (atomic %) | | | | | | | | |
|---|---|---|---|---|---|---|---|---|
| | Al | Cr | Fe | Co | Ni | Mn | O | C |
| Particle 1 | 14.61 | 15.54 | 14.00 | 14.05 | 13.94 | 13.53 | 1.28 | 13.05 |
| Particle 2 | 8.75 | 25.52 | 23.53 | 15.06 | 9.40 | 15.99 | 1.75 | — |

TABLE 3-continued

| Diffused Feedstock (atomic %) | | | | | | | | |
|---|---|---|---|---|---|---|---|---|
| | Al | Cr | Fe | Co | Ni | Mn | O | C |
| Particle 3 | 9.25 | 20.43 | 19.06 | 16.83 | 16.19 | 16.62 | 1.62 | — |
| Average | 10.87 | 20.49 | 18.63 | 15.31 | 13.17 | 15.38 | 1.85 | 4.35 |

The data reflects raw measured data truncated to two decimal places. This is beyond the statistical significance of the measurements which are less accurate than that amount of decimal places. The Table 4 and 5 data below is similarly truncated at two decimal places and actual measurement precision is far coarser (with Table 5 being calculated from Table 4). From Table 3, substantial variations are seen in, not merely the aluminum content, but some of the other elements. This suggests that there is a particle-to particle composition variation in the feedstock.

Additionally, one specimen had substantial carbon. This is believed to have resulted from partial exposure to residue of epoxy used to mount the specimen. All three had a moderate level of oxygen. This is believed within testing error for oxygen.

Table 4 shows composition measurements at three different depthwise locations in the coating. These were obtained by sampling at four or five distinct locations in three specific regions, respectively near the substrate surface, near the coating surface, and intermediate. Here, the variation amongst the five elements of the vendor/source feedstock is relatively low. Two of the three aluminum contents are unexpectedly high. This is believed due to sampling error. Table 5 discounts the oxygen so as to allow better comparison to the source to provide a further indicator of compositional variability. Specifically, it is not believed that there is any substantial differential attrition of any of the six elements of the nominal HEA. Accordingly, differences are believed to reflect variability and measurement/sampling error (small sample size). Additionally, the oxygen variation may also reflect variability and sample size-associated error. Also, due to oxidation or diffusion, it is possible that subsequent in-use measurements of a coating would reflect further changes in oxygen content. Thus, it may be appropriate to separately characterize the coating, on the one hand counting oxygen and on the other hand ignoring oxygen (e.g., looking only at metallic elements).

Additionally, a hybrid characterization may reflect both by characterizing the relative concentrations of metallic elements on the one hand while characterizing a relative concentration of oxygen to all metallic elements combined on the other hand. This takes the potential large variations in oxygen content out of the picture for characterization of metallic element content. Thus, an example characterization of the oxygen-containing coating is at least 50 atomic percent metals and up to 50 atomic percent oxygen, more narrowly, at least 50 atomic percent metals and up to 40 atomic percent oxygen or at least 60 percent metals and 15 percent to 40 percent oxygen.

TABLE 4

| Applied Coating (atomic %) | | | | | | | | | |
|---|---|---|---|---|---|---|---|---|---|
| | | Al | Cr | Fe | Cc | Ni | Mn | O | C |
| Location | Top | 13.92 | 12.85 | 14.01 | 13.82 | 12.99 | 12.43 | 19.95 | — |
| | Mid | 14.81 | 8.81 | 9.76 | 9.71 | 8.66 | 9.41 | 38.85 | — |
| | Base | 16.24 | 7.00 | 8.20 | 8.70 | 8.08 | 8.11 | 43.63 | — |
| | Avg | 14.99 | 9.55 | 10.65 | 10.74 | 9.91 | 9.98 | 34.23 | — |

TABLE 5

| Applied Coating (metals only (atomic %)) | | | | | | | |
|---|---|---|---|---|---|---|---|
| | | Al | Cr | Fe | Co | Ni | Mn |
| Location | Top | 17.40 | 16.06 | 17.51 | 17.27 | 16.23 | 15.53 |
| | Mid | 24.22 | 14.40 | 15.96 | 15.88 | 14.16 | 15.39 |
| | Base | 28.83 | 12.43 | 14.56 | 15.44 | 14.34 | 14.40 |
| | Avg | 23.48 | 14.30 | 16.01 | 16.20 | 14.91 | 15.11 |

Oxygen content in the as-deposited coating may reflect a combination of entrapped $O_2$ and oxygen contained in oxides particularly of the six main elements and, more particularly, likely biased towards $Al_2O_3$ and $Cr_2O_3$. In service, however, Co and Mn will oxidize (believed yielding $Co_2O_3$ and MnO) to provide a lubriciousness to the coating.

Oxide concentration, in-use, is most relevant at the contact surface. The coating comprises areas like areas 30 or 31 of FIG. 1D containing oxygen-rich zones, inside a mostly unoxidized metallic coating. The inventors believe an even an oxygen content as low as 5.0 atomic percent might be enough to ensure performance (as this % O is measured on a zone that contains areas 30 and areas 31 among others). However, higher minima may be advantageous such as at least 15.0 atomic percent O or an example 15.0% to 50% or 20% to 40% at the surface or in a depthwise layer below up to the entire layer. In such ranges, alternate ranges may be formed by using the lower limit of one range and the upper of another.

Although, below the table, dagger symbols are used to provide two examples of non-listed components, other values are possible. Thus, any of the examples or ranges could be multiplied by substituting the listed option for the other of the two listed options. Yet alternatively, for each of these, further alternative ranges may be provided such as ≤3.0 other elements total and ≤1.0 other elements individually; ≤2.0 other elements total and ≤1.0 other elements individually; ≤3.0 other elements total and ≤0.50 other elements individually. Additionally, the examples such as given above assume very little attrition of individual elements during the spray process. Thus, the as-sprayed coating may be characterized by any of those same examples and ranges. However, there may be attrition situations in which a source material outside one or more of the ranges is used to deposit as-deposited material within said one or more ranges (and vice-versa).

FIG. 1 shows an article 20 having an Example 4 HEA coating 26 HVOF sprayed on a surface 24 of a substrate 22. The example substrate is 304L stainless steel. The substrate may form a seal and the coating surface 28 surface may be the tribological interface of the seal. The coating 26 was deposited by the HVOF and the deposition parameters of Table 1. Additionally, high velocity air-fuel (HVAF) and cold spray are candidates. Of these three non-plasma techniques, HVOF generally has higher operating temperature and lower particle velocity than HVAF and cold spray. Cold spray generally has lower operating temperature and highest particle velocity. HVAF is generally intermediate in both parameters.

Figure 1B:
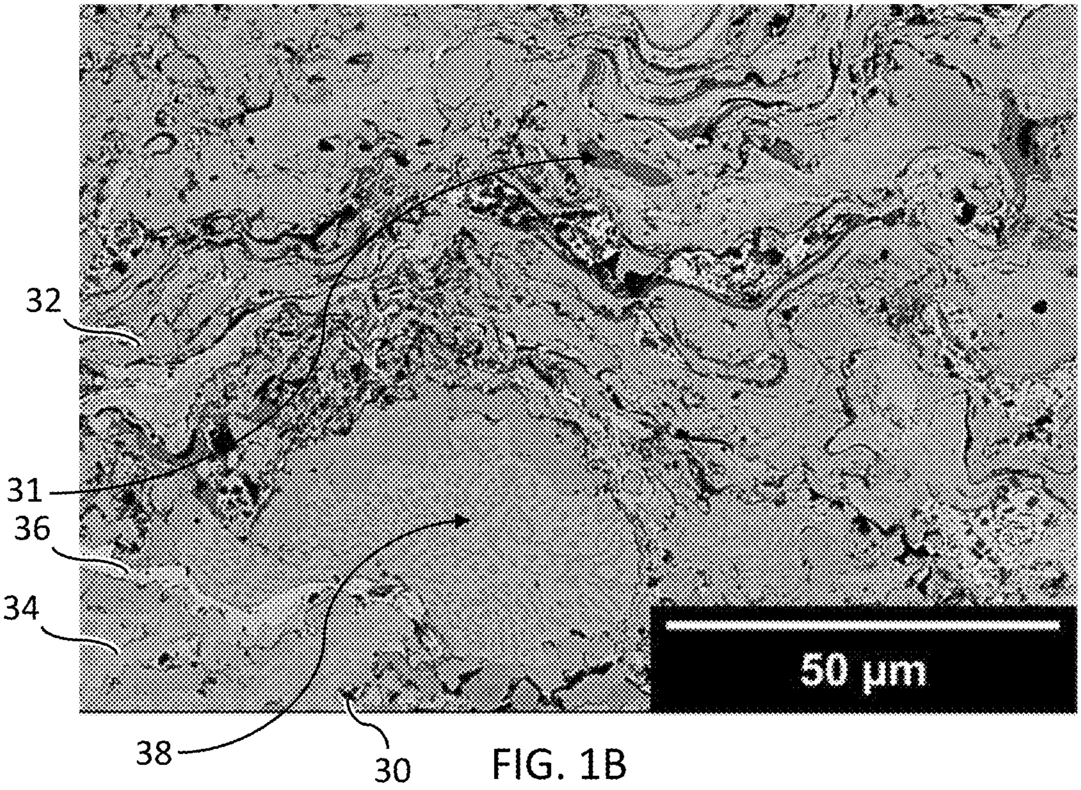
FIG. 1B is a further enlarged view of the micrograph of FIG. 1.

FIG. 1B shows that the resulting material has five apparent different phases, which are represented by different shades of grey and black. The black spots 30 are most likely areas where oxide formation ($Al_2O_3$) occurred during the spraying process. The darkest grey region 31 is most Al-rich, 32 next most Al-rich, less Al-rich regions 34 are lighter grey. Finally, the bright phase 36 is most likely the feedstock non-Al HEA matrix itself (e.g., FeCoCrNiMn in the example).

Figure 1C:
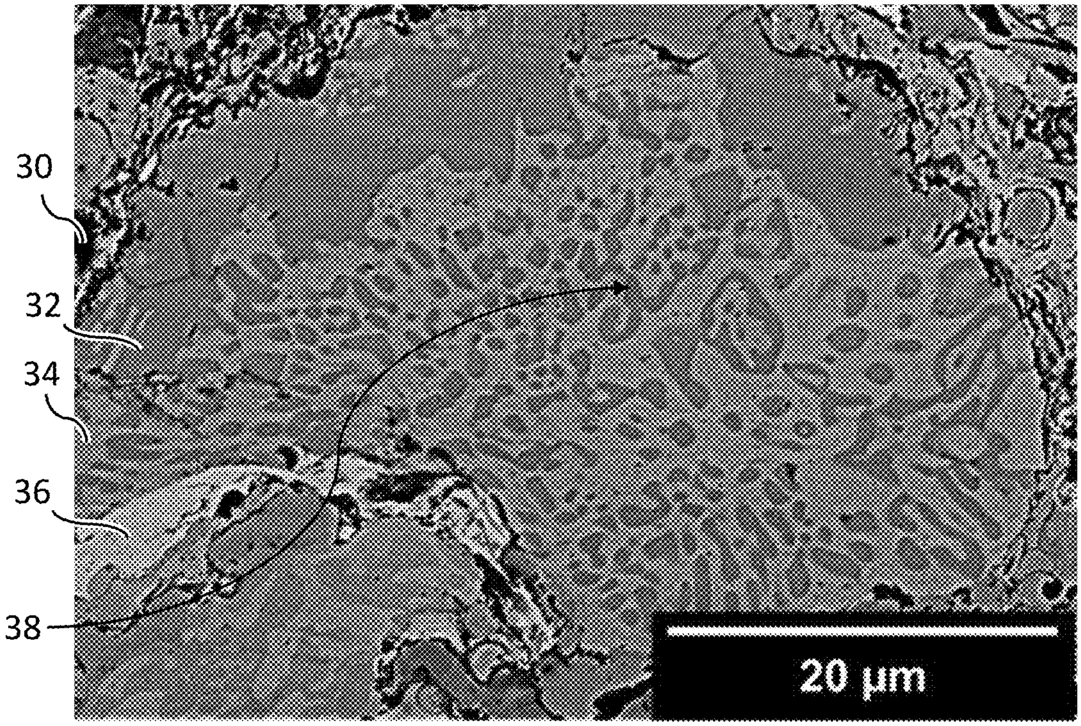
FIG. 1C is an enlarged view of the micrograph of FIG. 1B.
Figure 1D:
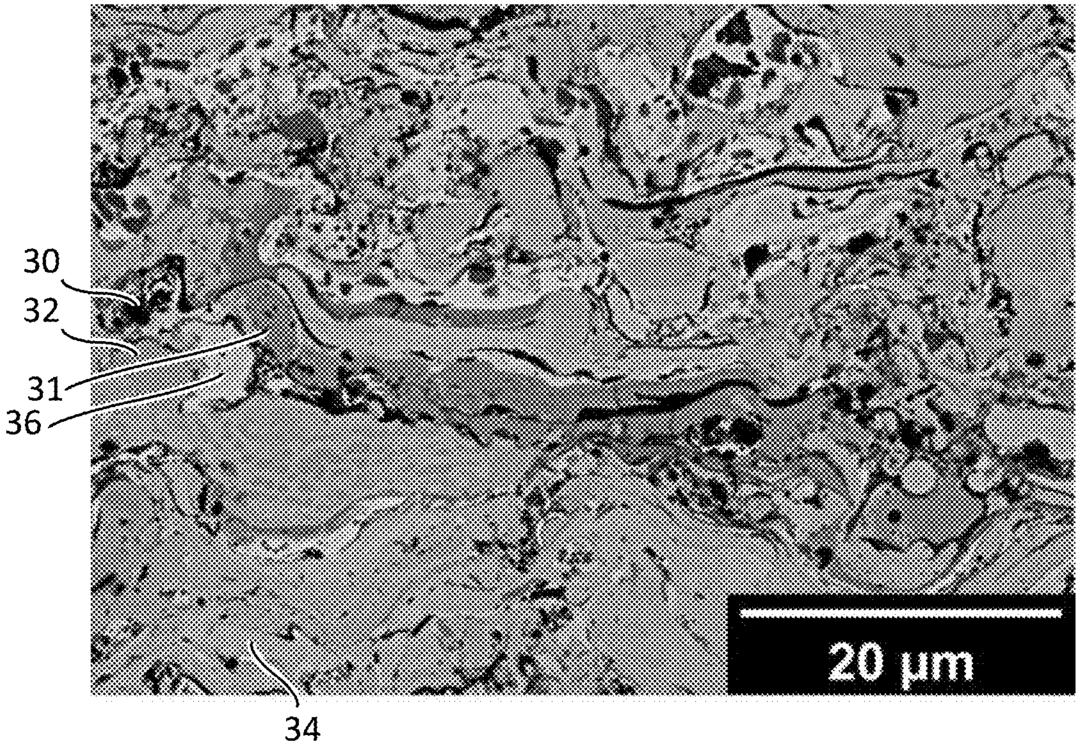
FIG. 1D is a further enlarged view of the micrograph of FIG. 1.

FIG. 1B also shows a semi-molten particle 38 (i.e., a particle that only partially melted during the spray). FIG. 1C is an enlarged view of the semi-molten particle essentially filling the screen. In FIG. 1C, we see the remnant of an aluminum-rich outer layer 32 near the top of the view with aluminum having diffused into the HEA throughout elsewhere.

Figure 2:
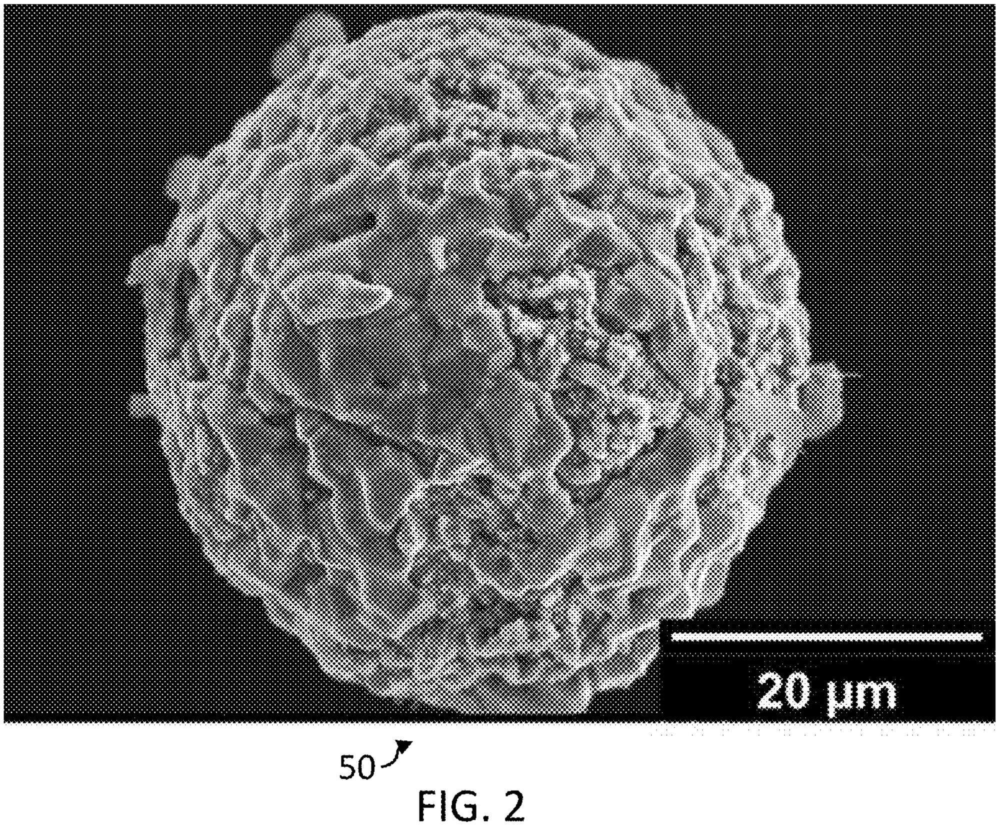
FIG. 2 is a photograph of an Al-diffused HEA particle.
Figure 3:
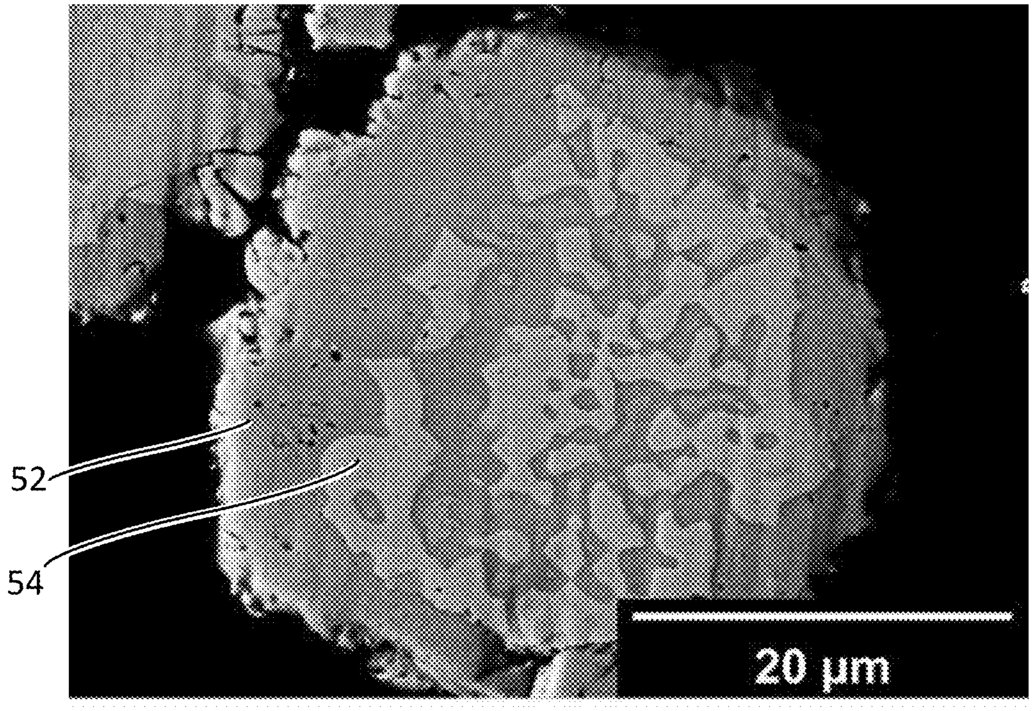
FIG. 3 is a sectional micrograph of an Al-diffused HEA particle.
Figure 4:
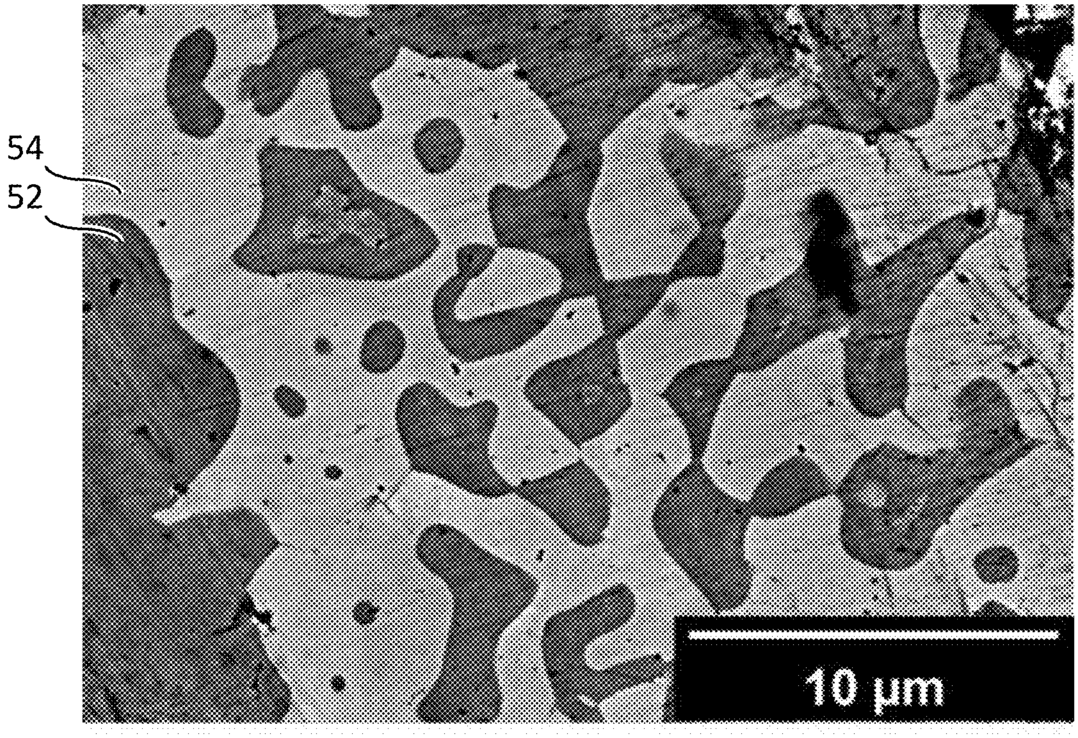
FIG. 4 is an enlarged sectional micrograph of an Al-diffused HEA particle.

FIG. 2 shows surface morphology of a particle 50 of an aluminum-diffused HEA of the Ex. 4 composition after grinding to reduce the agglomeration from the diffusion process. The sectional views of FIGS. 3 and 4 show darker relatively aluminum-rich areas 52 and lighter areas 54 of original source HEA.

Wear and friction testing of the Example 4 coating on stainless steel was performed against an alumina ball counterface at 5N normal load, room temperature (25° C.), sliding velocity 31 mm/s, 1 Hz, 10 mm track length, 5000 cycles, total track length 100 m.

A wear rate was $30\pm4\times10^{-5}$ $mm^3$/N·m for the HVOF Example 4 coating in contrast to $102\pm8\times10^{-5}$ $mm^3$/N·m for a comparative reference HVOF FeCoCrMnNi HEA coating. The reference coating was sprayed with the same parameters. Also, the HVOF Example 4 coating had a measured hardness of 585+/−21 Hv0.3; whereas the reference HVOF FeCoCrNiMn coating had a measured hardness of 380+/−26 Hv0.3.

Figure 5:
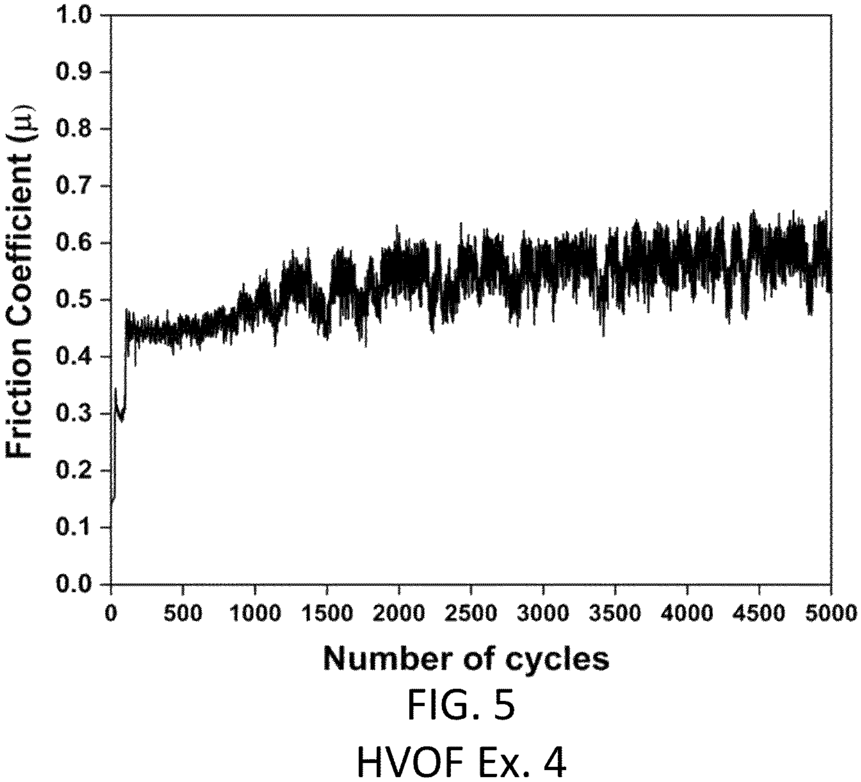
FIGS. 5 and 6 respectively are cycle use test plots of friction coefficients for an HVOF AlFeCoCrMnNi HEA coating and a reference HVOF FeCoCrMnNi HEA coating.
Figure 6:
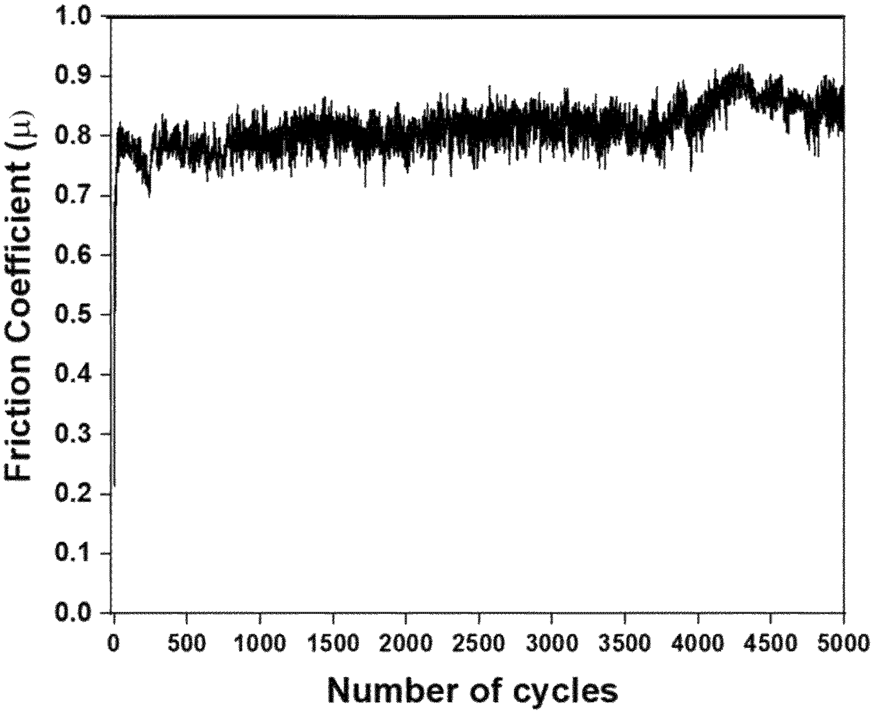

FIGS. 5 and 6 respectively show friction coefficients for the HVOF Example 4 HEA coating and the reference HVOF FeCoCrMnNi HEA coating on 304L stainless steel substrates. The former is roughly two-thirds of the latter. Despite testing the present parameters only on steel, the parameters are believed to transfer to nickel-based superalloy substrates and cobalt-based superalloy substrates in applications such as described above and below.

Figure 7:
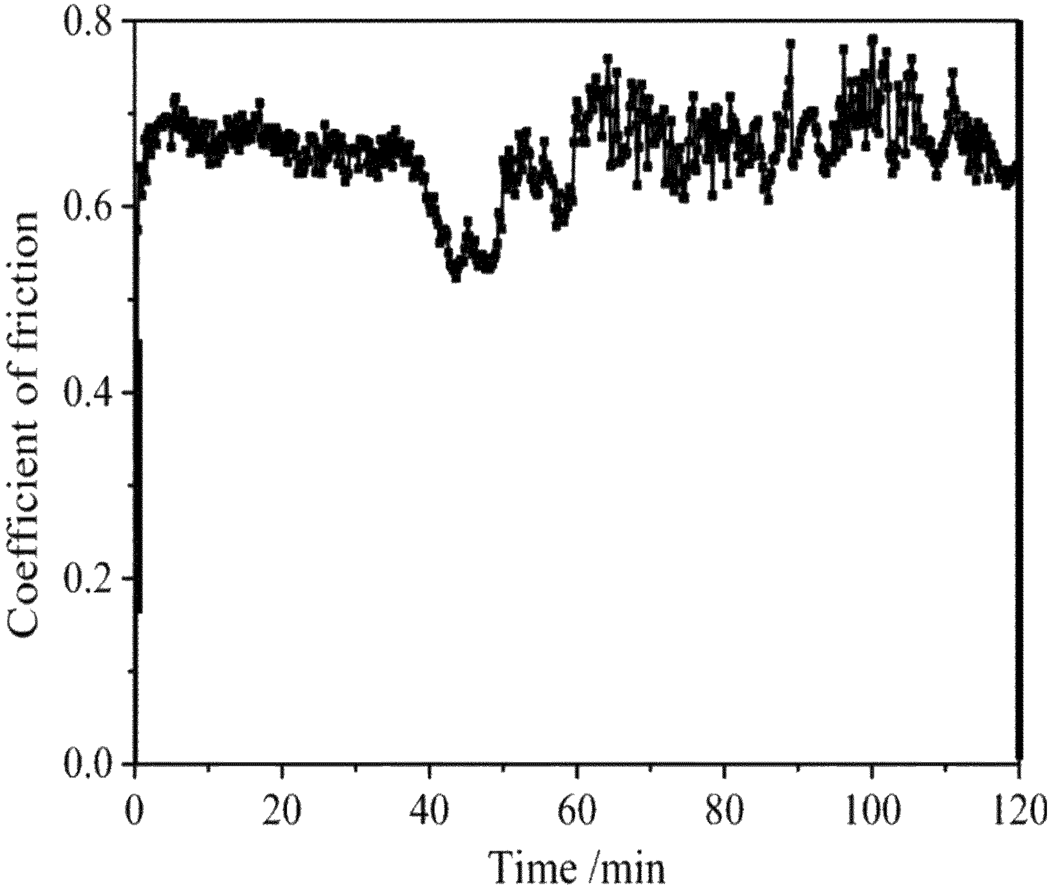
FIG. 7 is a cycle use test plot of friction coefficient for an uncoated single-crystal uncoated DD6 substrate.

By way of further comparison, FIG. 7 shows friction coefficient for the uncoated SX DD6 substrate. Test was against an $Si_3N_4$ ball counterface at 20N normal load, room temperature (25° C.), sliding velocity 560 rpm, 120 minutes, total sliding distance 75 m.

Figure 8:
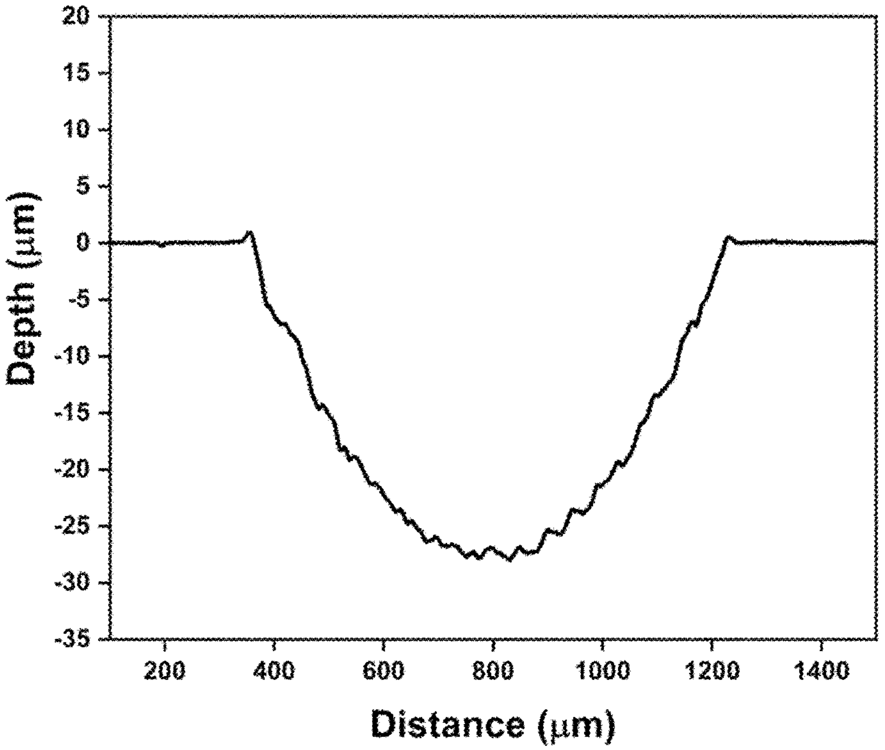
FIG. 8 is a wear track plot for an HVOF AlFeCoCrNiMn coated substrate.
Figure 9:
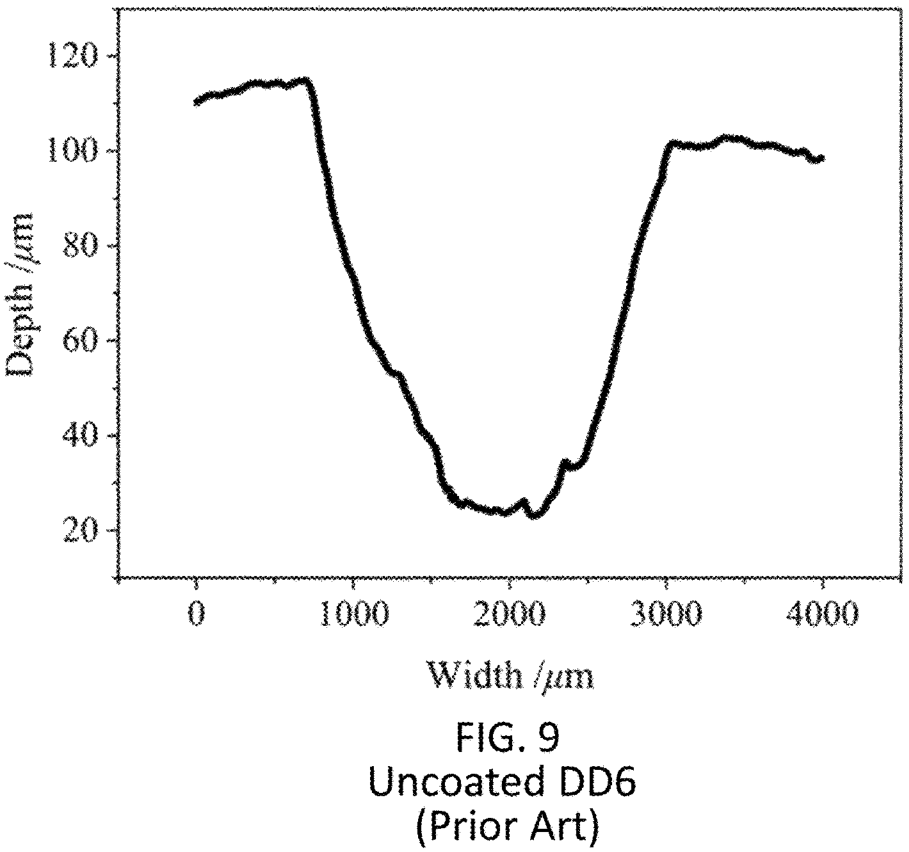
FIG. 9 is a wear track plot for an uncoated single-crystal uncoated DD6 substrate.

FIGS. 8 and 9 plot the wear depth of the FIGS. 5 and 6 tests, respectively.

In general, the aluminum is believed to act as a BCC stabilizer to increase hardness. The manganese stabilizes the FCC to make it more ductile to compensate for the hardness. It also forms Mn-containing oxide layer for lubricity.

The use of a diffused Al mixture with an HEA is believed to yield the less homogenous structures of both the powder and the applied coating (e.g., relative to a powder formed by atomizing an Al-containing HEA). The inhomogeneity is believed to provide an advantageous combination of lubricious oxides and mechanical properties.

Optionally there may be a surface finishing (e.g., ASTM E-3) performed on the as sprayed coating to achieve a surface finish (Sa)~1 μm. An example surface finishing may involve mechanical methods such as grinding, polishing or peening to reduce surface roughness. Such surface finishing may be particularly relevant to the OD surface of a PSR and less to coated bellows seals and the like.

An example use situation is a coating on the outer diameter (OD) surface of the substrate of a piston seal ring (PSR). Example PSR substrate material is nickel- or cobalt-based superalloy (e.g., wrought). Example, nickel-based superalloy legacy alloys are IN-718 (UNS N07718/W.Nr. 2.4668, Inconel® alloy 718 Huntington Alloys Corp., Huntington WV), X750 (UNS N07750/W. Nr. 2.4669, Inconel® alloy X750 Huntington Alloys Corp., Huntington WV), and Waspaloy (alloy 685, N07001). However, new alloys are continually being proposed. Example coating thickness is at least 50 micrometers, more particularly 50 micrometers to 250 micrometers or 50 micrometers to 200 micrometers or 75 micrometers to 125 micrometers. An example counterface is a mid turbine frame formed of a Ni-based alloy or superalloy (e.g., uncoated), such as Inconel® 718 (IN-718; UNS N07718; AMS 5662), Inconel® 100 (IN-100; UNS N13100; AMS 5397), and Inconel® 713C (IN-713C; Alloy 713C) each of (Huntington Alloys Corp., Huntington, WV) and Mar-M-247. An example cobalt-based superalloy is Haynes® 188 (UNS R30188) of Haynes International, Kokomo, Indiana. However, new alloys are continually being proposed. An alternative example involves a PSR in an OD groove on a spool/rotor tie shaft with the primary counterface being the ID surface of a disk bore of that spool/rotor.

Another example is a sheetmetal static seal. For example, as in the '122 publication baseline, stainless steel or nickel- or cobalt-based superalloy or other seal substrates may be formed by deforming sheetmetal or may be cast or otherwise formed. On an axial compression seal such as a bellows seal or a W-seal, the present coating may be applied at least at axial ends of the seal. This may involve masking the remaining portions of the seal (e.g., via hard masking at the inner diameter and outer diameter boundaries of the seal) during the HVOF. However, other such seals may have a greater coating extent or a full coating extent.

Similarly, for radial compression seals, the ID and OD of the seal may be coated. Again, this coating may involve masking axial ends. However, particularly for C-seals, it may be desired to coat the entire outside of the C (the convex surface when viewed in central axial cross-section rather than the concave interior of the cross-section). For any of these, coating thickness may be similar to that described for the PSR.

Additionally, for either the PSR or the other seals, yet different substrate materials are possible. For example, it may be possible to use the present HEA coating on a seal having a different HEA substrate whose properties are chosen for purposes other than reduced wear and friction (e.g., thermal stability, fatigue resistance, and the like).

Figure 10:
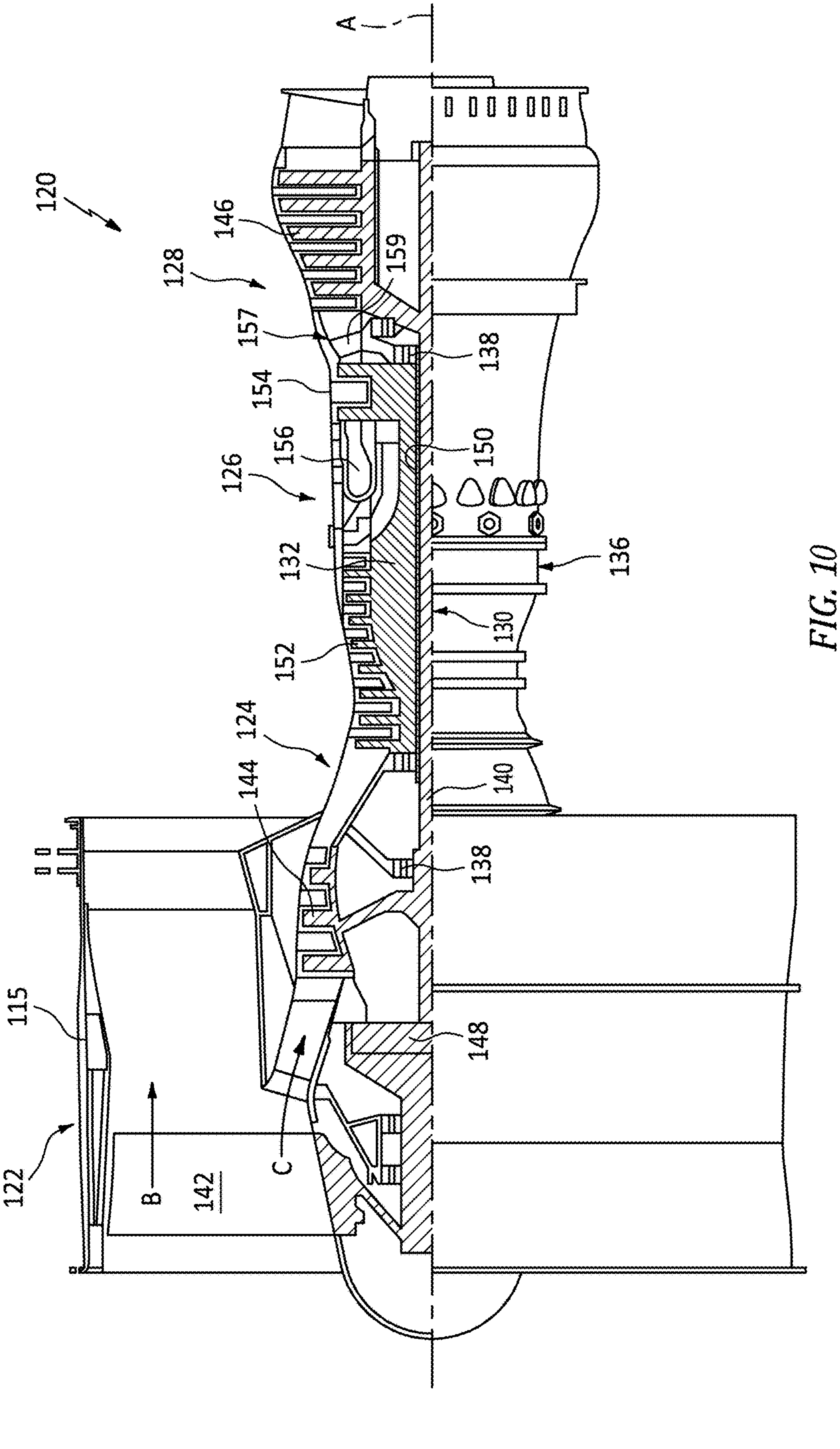
FIG. 10 is a view of a gas turbine engine.

FIG. 10 schematically illustrates a gas turbine engine 120. The example gas turbine engine 120 is a two-spool turbofan that generally includes a fan section 122, a compressor section 124, a combustor section 126, and a turbine section 128. The fan section 122 drives air along a bypass flow path B in a bypass duct defined within a housing 115, such as a fan case or nacelle. The fan section also initially drives air along a core flow path C for compression through the compressor section and communication into the combustor section 126 then expansion through the turbine section 128. Although depicted as a two-spool turbofan gas turbine engine in the disclosed non-limiting embodiment, it should be understood that the concepts described herein are not limited to use with two-spool turbofans as the teachings may be applied to other types of turbine engines.

The example engine 120 generally includes a low speed spool 130 and a high speed spool 132 mounted for rotation about an engine central longitudinal axis A relative to an engine static structure 136 via several bearing systems 138. It should be understood that various bearing systems 138 at various locations may alternatively or additionally be provided, and the location of bearing systems 138 may be varied as appropriate to the application.

The low speed spool 130 generally includes an inner shaft 140 that interconnects, a first (or low) pressure compressor 144 and a first (or low) pressure turbine 146. The inner shaft 140 is connected to the fan 142 through a speed change mechanism, which in the example gas turbine engine 120 is illustrated as a geared architecture 148, to drive a fan 142 at a lower speed than the low speed spool 130. The high speed spool 132 includes an outer shaft 150 that interconnects a second (or high) pressure compressor 152 and a second (or high) pressure turbine 154. A combustor 156 is between the high pressure compressor 152 and the high pressure turbine 154. A mid-turbine frame 157 of the engine static structure 136 may be arranged generally between the high pressure turbine 154 and the low pressure turbine 146. The mid-turbine frame 157 further supports one or more of the bearing systems 138 in the turbine section 128. The inner shaft 140 and the outer shaft 150 are concentric and rotate via bearing systems 138 about the engine central longitudinal axis A which is collinear with their longitudinal axes.

The core airflow is compressed by the low pressure compressor 144 then the high pressure compressor 152, mixed and burned with fuel in the combustor 156, then expanded over the high pressure turbine 154 and low 146 pressure turbine. The example mid-turbine frame 157 includes airfoils 159 which are in the core airflow path C. The turbines 146, 154 rotationally drive the respective low speed spool 130 and high speed spool 132 in response to the expansion. It will be appreciated that each of the positions of the fan section 122, compressor section 124, combustor section 126, turbine section 128, and fan drive gear system 148 may be varied. For example, gear system 48 may be located aft of the low pressure compressor, or aft of the combustor section 26 or even aft of turbine section 128, and fan 142 may be positioned forward or aft of the location of gear system 48

Figure 10A:
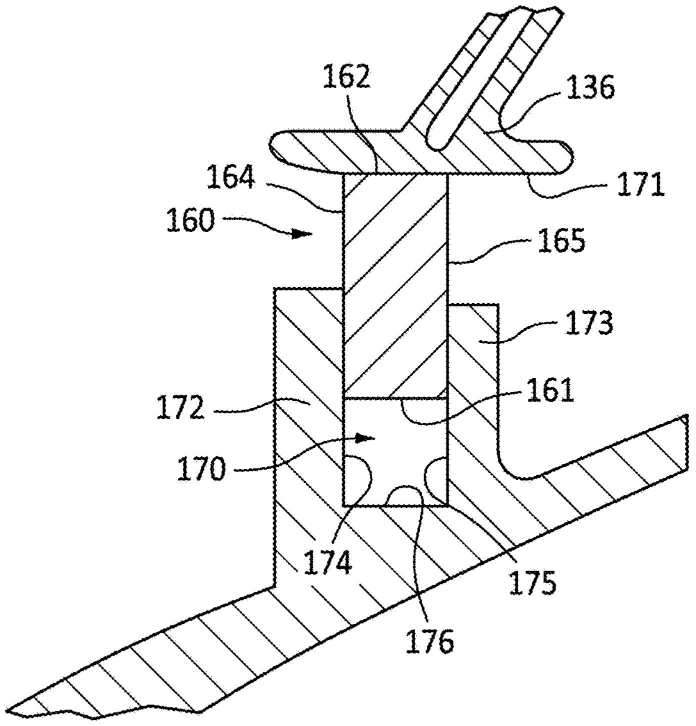
FIG. 10A is an enlarged view of a first seal system in the engine of FIG. 10.

FIG. 10A shows one example seal in the engine as a piston seal 160. The example seal 160 (and its metallic substrate) has an inner diameter (ID) surface 161, an outer diameter (OD) surface 162, and axial end surfaces 164 and 165. The seal follows a constant cross-sectional shape and forms a split ring with a shiplap or similar joint (not shown).

In the illustrated example, the piston seal 160 is partially accommodated in a radially outwardly open groove 170 in an inner member and its OD surface is engaged to an inner diameter (ID) surface 171 of an outer member. The example inner member is a vane structure (e.g., circumferential vane array) of the mid turbine frame 157. The example outer member is a seal runner of the static structure 136. The example groove is formed by the interior surfaces 174, 175 of wall sections 172, 173 and a base surface 176. The example walls have OD rims and outboard axial faces opposite the respective faces 174, 175.

Principal contact between the seal and the contacting members is between the seal OD surface 162 and the runner ID surface 171. Additional contact may be between the seal axial end surfaces and the adjacent groove wall surface. Wear and damage may occur at any of these. Typically, the counterface members nay be uncoated alloy at the interfaces (e.g., uncoated at the surfaces 171, 174, 175). Thus, the seal substrate surface at the seal OD and/or axial end faces (or the entire cross-sectional perimeter surface) may be coated as above.

Figure 10B:
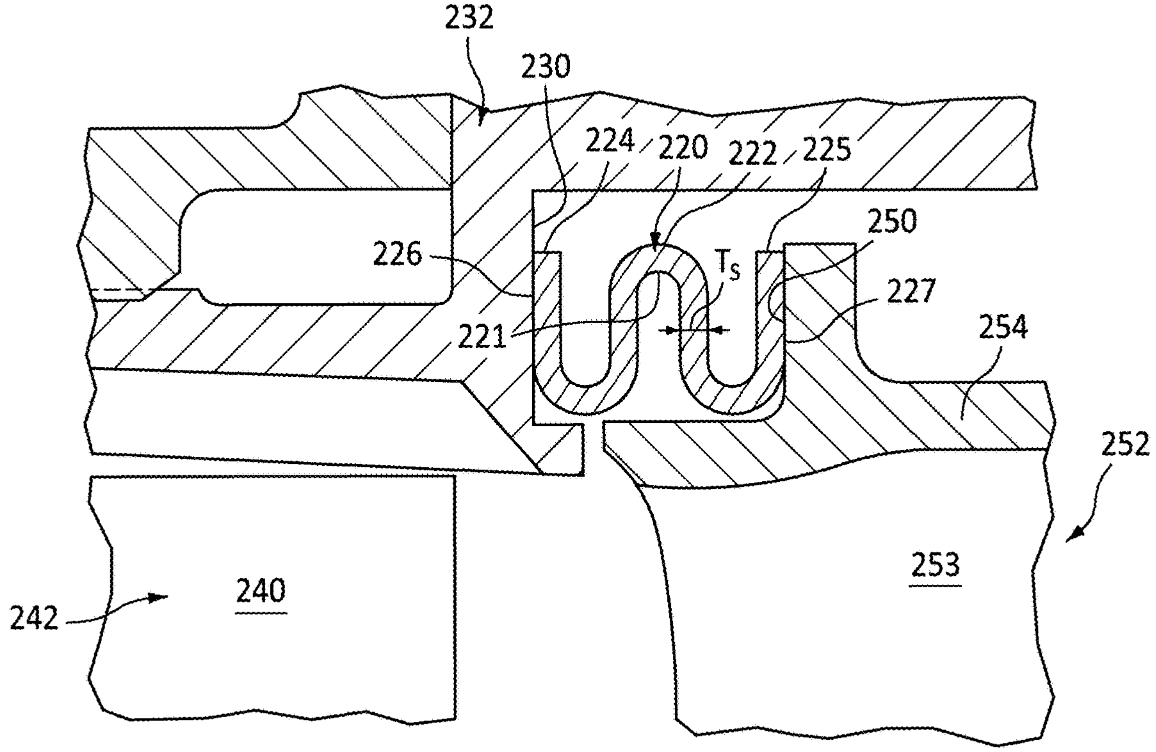
FIG. 10B is an enlarged view of a second seal system in the engine of FIG. 10.

Another example is a spring compression static seal. For example, as in the '122 publication baseline, stainless steel or nickel-based superalloy or other seal substrates may be formed by deforming sheetmetal or may be cast or otherwise formed. Example seals include axial compression seals such as a bellows seal or a W-seal, or for radial compression seals, such as C-seals or E-seals. For example, seal 220 (FIG. 10B) is a bellows or similar type seal with convoluted cross-section effective to be deformed under compression to self-spring-bias engagement with the counterface members. The cross-section generally has a generally inner diameter (ID) surface 221, a generally outer diameter (OD) surface 222 generally parallel and spaced apart from the ID surface by a material thickness $T_S$, and end surfaces 224 and 225. In an installed axially compressed state, axial ends 226, 227 of the seal are formed by portions of one of the surfaces 221, 222 (both 221 in the example). The illustrated seal is a W-seal although other configurations are possible (e.g. more or fewer cycles of the cross-sectional wave form) as are radial seals (e.g., an E-seal).

For the example seal 220, forward counterface members engaging the axial end 226 are a radially extending end surface portions 230 of a circumferential array of blade outer air seals (BOAS) 232. BOAS ID surfaces closely surround tips of airfoils 240 of a stage of blades 242. For the example seal 220, aft counterface members engaging the axial end are a radially extending end surface portions 250 of the OD shrouds 254 of a circumferential array of vanes 252. Example vanes are in clusters with multiple airfoils 253 per cluster.

In these example embodiments, wear may notably occur at counterface surfaces 171, 174, 175, 230, and 250. Each example counterface member (including other counterface member or other component (e.g., seal) discussed below to be coated) may be formed of a nickel- or cobalt-based based (e.g., largest by weight component Ni or Cr, respectively) alloy or superalloy (e.g., uncoated or coated), such as Inconel® 718 (IN-718; UNS N07718; AMS 5662), Inconel® 100 (IN-100; UNS N13100; AMS 5397)), and Inconel® 713C (IN-713C; Alloy 713C) each of (Huntington Alloys Corp., Huntington, West Virginia), Mar-M-247 and Haynes® 188 (UNS R30188) of Haynes International, Kokomo, Indiana.

Thus, the seal substrate surface at least at the axial ends 226, 227 (forming contact surfaces) (or the entire cross-sectional perimeter surface) may be coated as above. In the seal relaxed/extended pre-installation condition, the areas to be coated may be other than axial ends (e.g., shifted along the surface 221).

Figure 10C:
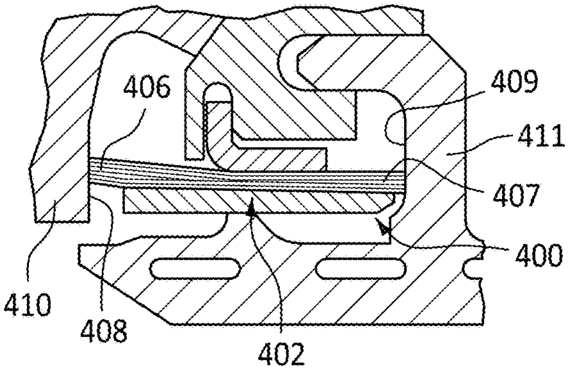
FIG. 10C is an enlarged view of a third seal system in the engine of FIG. 10.

Additional seal applications include brush seal systems, namely coating the brush seal counterface (e.g., runner). Typical brush seals have radially inwardly extending bristles engaging the OD surface of the counterface. U.S. Pat. No. 6,170,831B1 (the '831 patent), of Bouchard, Jan. 9, 2001, and entitled "Axial Brush Seal for Gas Turbine Engines", the disclosure of which is incorporated by reference herein in its entirety as if set forth at length, discloses a double-ended axial static brush seal system partially re-presented as 400 in FIG. 10C. The brush 402 has two protruding bristle sections 406, 407 (e.g., of a single cluster of bristles) engaging respective counterfaces (a case segment and a blade outer air seal segment). FIG. 10C shows the coating may be applied by the present methods to the counterface surface 408, 409 of the counterface substrate 410, 411 to engage the bristles.

Figure 13:
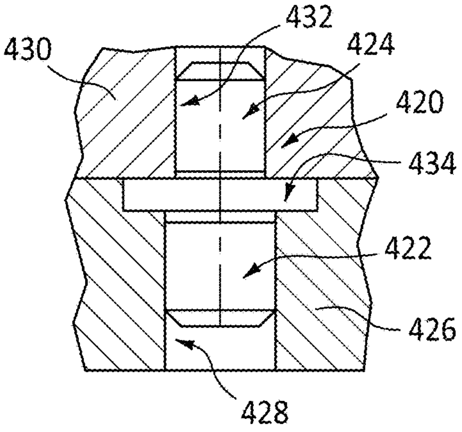
FIG. 13 is a longitudinal sectional/cutaway view of a locating pin joint.

Other examples involve locating pins. A typical locating pin 420 (FIG. 13) has, forming opposite axial end sections of the pin, a base section or shank 422 for press-fit or threading into a hole or socket 428 in a first component 426 and a head 424 for accommodation in a hole or socket 432 of a second component 430. A flange 434 (if present) may separate the base or shank from the head. The head will typically have a tapered portion for guidance into the receiving socket 432. With a press-fit pin, the OD surface of the press-in base or shank may be coated by the present methods. Additionally, the head and flange faces may be coated. With a threaded pin, it is more likely that only the flange and head may be coated and not the threaded shank.

Figure 17:
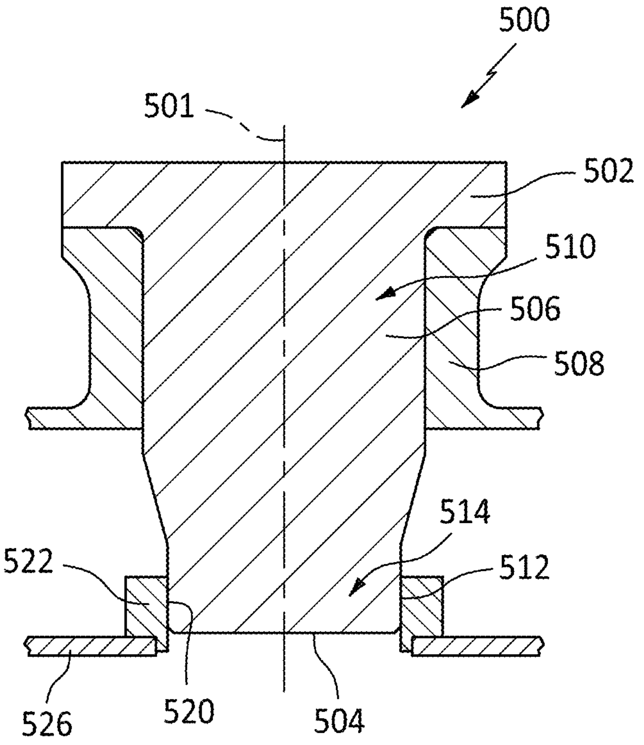
FIG. 17 is a longitudinal sectional view of an alternate locating pin joint.

FIG. 17 shows an alternate locating pin joint having a locating pin 500. FIG. 17 shows the joint and pin as having a common axis 501. Forming a first/proximal end of the pin in this example is a head or terminal flange 502. A shaft generally extends from an underside of the head to a distal end 504. A proximal portion 506 of the shaft mounts to a first component 508. An example first component is an engine case. An example mounting is via press-fit or threading into a boss of the case either directly or to an insert in the boss. In this example, the shaft exterior surface 512 along a proximal portion 510 of the shaft is so externally threaded to mate with an internal thread of the case boss or insert.

Along a distal end portion 514 of the shaft, the shaft exterior surface 512 is in sliding engagement with a second component. An example engagement is with the inner diameter surface 520 of a boss 522 of the second component acting as a socket for said pin distal end portion. In the example, the second component is an annular combustion chamber liner 526 held spaced apart from the case (e.g., radially inward). The boss may be separately formed from and welded to a main section of the liner. Example wearing movement is between the OD surface 512 and ID surface 520. Relative movement is parallel to the axis 501 and typically results from differential thermal expansion and engine vibration. Thus, one or both of these surfaces (surface 512 along the distal portion and surface 520) may be coated via the present methods.

Figure 14:
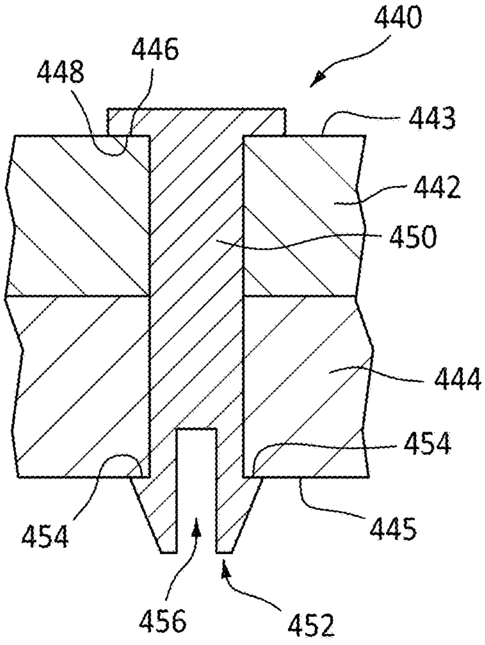
FIG. 14 is a longitudinal sectional view of a snap fastener joint.

Another snap example is a separate snap fastener 440 (FIG. 14) (e.g., holding two (or more) generally flat sections (pieces) of material 442 and 444 against each other as if a rivet). In one example, the fastener has a head 446 with an underside 448 against the outer face 443 of one terminal piece 442 of the stack of mated pieces. A shaft or shank 450 extends from the underside to a tip/end 452. Adjacent the tip, the shaft has a barbed backlocking surface 454 (underside) facing the head and backlocked against the outer face 445 of the opposite terminal piece 444 in a sandwich of two or more pieces. Example fasteners have longitudinally split areas near the tip allowing insertion through holes in the pieces with the insertion compressing the slot 456 to allow passage of the barbs 458 and then relaxing once the barbs pass out of engagement with the members so as to back lock surfaces 454 to 445. Due to the relatively higher engagement pressures along the barb undersides 454 versus the head underside, the barb underside region and transition to shank main body 456 is a particular area for coating. With the snap fastener, the shaft/shank main body may also be coated by the present methods to limit wear of the holes in the mated components.

Figure 10D:
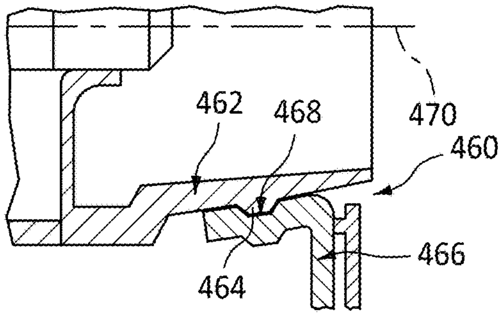
FIG. 10D is an enlarged view combustor swirler in the engine of FIG. 10.

Among additional locations for the coating are in snap fit interfaces 460 (FIG. 10D) (e.g., either fully backlocked or detented). One example of a snap fit between two components involving a bead and groove interaction for mounting a swirler is shown in U.S. Pat. No. 10,101,031B2 (the '031 patent), of Williams et al., Oct. 16, 2018, and entitled "Swirler Mount Interface for Gas Turbine Engine Combustor", the disclosure of which is incorporated by reference herein in its entirety as if set forth at length. The '031 patent discloses an OD (relative to swirler/injector axis 470) projection or bead 464 on a swirler 462 captured in an ID groove 468 in a bulkhead support shell 466. The coating may be applied by the present methods to one or both of the inner member (e.g., swirler) and outer member (e.g., bulkhead support shell) at the bead or groove and adjacent contacting OD and ID surface regions respectively. Often, ease of spraying may make it easiest to just apply to the OD surface of the inner member. But, with a large diameter and relatively small axial extent, it may be easy to also have normal spray access to the bulkhead ID surface to coat both pieces.

Figure 15:
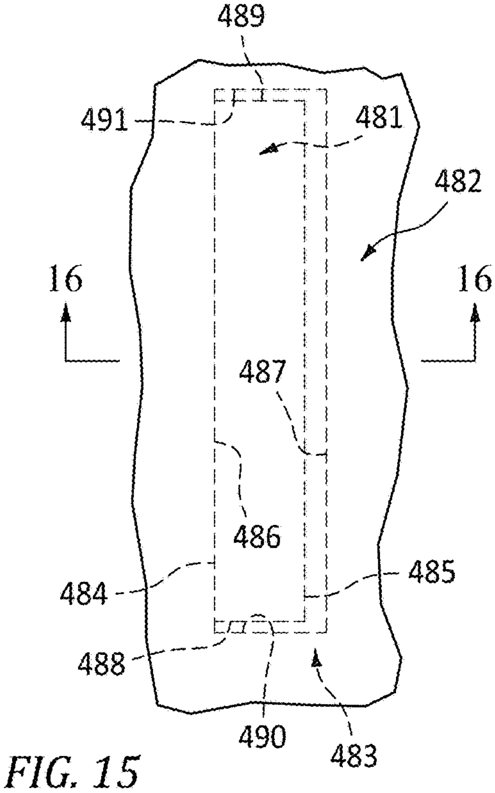
FIG. 15 is an inward radial view of a mounting tab-in-slot joint.
Figure 16:
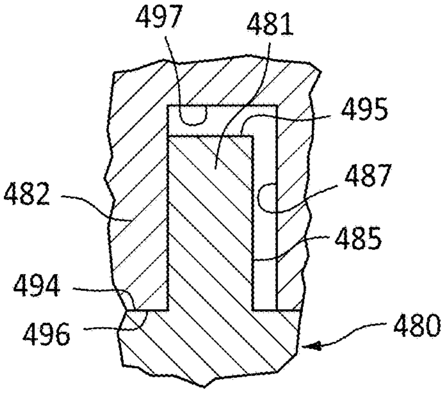
FIG. 16 is a longitudinal sectional view of the joint of FIG. 15.

Additional examples involve tabs 481 (FIGS. 15&16) of a first component 480 in slots 483 in a second component 482 For example, in many annular mounting situations, tabs may protrude radially (inward or outward depending on the situation) and be received in associated slots. Example such tabs have first and second axial end faces 484, 485 facing or contacting slot end faces 486 and 487 and tab circumferential end faces (ends) 488, 489 contacting or facing slot circumferential end faces (ends) 490, 491. Typically, pressure or spring loading will bias one axially facing face 484 of the tab against the adjacent axially facing face 486 of the slot. Particularly that axial end face of the tab may be coated via the present methods. But also, circumferential end faces will typically provide some locating function and may also be coated. Spray access makes it easier to coat the tab faces (with a normal angle of incidence than coating slot faces (where the angle will be more off normal).

Additional seal applications include examples involve knife edge seals (not shown). A typical knife edge seal has hardened knife edges. Thus, the runner (usually an OD surface of an inner member but optionally an ID surface of an outer member) may be the counterface coated by the present methods. An example knife edge seal is shown in U.S. Pat. No. 10,167,729B2 (the '729 patent), of Aiello et al., Jan. 1, 2019, and entitled "Knife Edge with Increased Crack Propagation Life", the disclosure of which is incorporated by reference herein in its entirety as if set forth at length.

Additional seal applications involve finger seals (e.g., of steel or other alloys discussed above). With finger seals, the contacting portions of the seals themselves and/or the counterface surface may be coated via the present methods. Example finger seals are shown in U.S. Pat. No. 10,094,389B2 (the '389 patent), of Chuong et al., Oct. 9, 2018, and entitled "Flow Diverter to Redirect Secondary Flow", and U.S. Pat. No. 9,845,695B2 (the '695 patent), of Budnick et al., Dec. 19, 2017, and entitled "Gas Turbine Seal Assembly and Seal Support", the disclosures of which are incorporated by reference herein in their entireties as if set forth at length.

Additional seal applications involve so-called HALO seals (not shown). One example is shown in U.S. patent Ser. No. 10/221,714B2 (the '714 patent), of Peters et al., Mar. 5, 2019, and entitled "Secondary Seal Device(s) with Alignment Tab(s)", the disclosure of which is incorporated by reference herein in its entirety as if set forth at length. The ID surface of the HALO seal may be coated by the present methods as may be the OD surface of the inner member or shaft. Additionally, alignment or mounting tabs are typical in such seals and may be coated as noted above.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A seal comprising:
a metallic substrate; and
a coating layer,
wherein:
the substrate is a nickel-based alloy;
the coating layer comprises in atomic percent of all metals in the coating layer:
6.5 to 22.0 Al;
16.0 to 23.0 Fe;
16.0 to 23.0 Co;
16.0 to 23.0 Cr;
16.0 to 23.0 Mn; and
14.0 to 23.0 Ni.

2. The seal of claim 1 wherein:
the coating layer comprises in overall atomic percent:
at least 15.0 O.

3. The seal of claim 1 wherein the coating layer comprises by atomic percent of all metals in the coating layer:
no more than 1.0 other individually and 5.0 other total.

4. The seal of claim 3 wherein:
the coating layer has a thickness of at least 50 micrometers.

5. The seal of claim 1 wherein:
the coating layer has a thickness of at least 50 micrometers.

6. The seal of claim 1 wherein:
the coating layer is an outermost layer.

7. The seal of claim 1 wherein the coating layer comprises in atomic percent of all metals in the coating layer:
14.0 to 22.0 Al;
16.0 to 22.0 Fe;
16.0 to 22.0 Co;
16.0 to 22.0 Cr;
16.0 to 22.0 Mn
16.0 to 22.0 Ni; and
no more than 1.0 other individually and 5.0 other total.

8. The seal of claim 1 wherein:
the substrate has a bellows section; and
the coating layer is at least on axial ends of the bellows section;
or wherein:
the seal is a split ring; and
the coating layer is at least on an outer diameter surface of the substrate;
or wherein:
the seal is a finger seal; and
the coating layer is at least on contact face of the substrate.

9. A method for manufacturing the seal of claim 1, the method comprising:
spraying powder to form the coating layer.

10. A method for using the seal of claim 1, the method comprising:
engaging the coating layer with a counterface; and
subjecting the seal and counterface to relative sliding movement.

11. The method of claim 10 wherein:
the engaging comprises compressing.

12. A gas turbine engine including the seal of claim 1 and further comprising:
one or more compressor sections;
a combustor;
one or more turbine sections; and
a gaspath passing through the one or more compressor sections, the combustor section, and the one or more turbine sections, said seal sealing between relatively nonrotating components.

13. The gas turbine engine of claim 12 further comprising:
a counterface engaging the coating and comprising uncoated nickel-based alloy.

14. The method of claim 9 wherein:
the spraying is HVOF, HVAF, or cold spray.

15. The method of claim 9 further comprising:
forming the powder by blending an aluminum-based powder with an HEA powder; and
thermally diffusing the blend.

16. The method of claim 13 further comprising:
after the thermally diffusing, grinding to reduce agglomeration caused by the thermally diffusing.

17. A method for coating a seal, the seal comprising:
a metallic substrate forming a split ring or a full annulus,
the method comprising:
HVOF spraying a powder to the substrate to form a coating layer, the powder comprising by atomic percent:
6.5 to 22.0 Al;
16.0 to 23.0 Fe;
16.0 to 23.0 Co;
16.0 to 23.0 Cr
14.0 to 23.0 Mn; and
14.0 to 23.0 Ni.

18. The method of claim 17 wherein the powder comprises by atomic percent:
no more than 1.0 other individually and 5.0 other total.

19. The method of claim 17 wherein:
the substrate has shape to form a split ring seal and the spraying is to an outer diameter surface of the substrate; or
the substrate has shape to form an axial spring seal and the spraying is to axial end surfaces of the substrate; or
the substrate has shape to form a finger seal and the spraying is to a contact surface of the substrate; or
the substrate has shape to form a radial spring seal and the spraying is to radial end surfaces of the substrate; or
the substrate has shape to form a HALO seal and the spraying is to an inner diameter surface of the substrate.

20. A method for coating an article, the article comprising:
a metallic substrate,
the method comprising:
blending an Al-based powder with a high entropy alloy powder of Fe, Co, Cr, Mn, and Ni thermally diffusing the blended powders; and
HVOF spraying the diffused powders atop the substrate to form a coating layer.

21. The method of claim 20 wherein the blend comprises by atomic percent:
6.5 to 22.0 Al;
16.0 to 23.0 Fe;
16.0 to 23.0 Co;
16.0 to 23.0 Cr
14.0 to 23.0 Mn; and
14.0 to 23.0 Ni,
wherein:
the thermally diffusing the blended powders causes agglomeration; and
the method further comprises, after the diffusion, grinding to reduce the agglomeration.

22. The method of claim 20 wherein the blend comprises by atomic percent:
no more than 1.0 other individually and 5.0 other total.

23. The method of claim 22 wherein:
the substrate has shape to form a split ring seal and the spraying is to an outer diameter surface of the substrate; or
the substrate has shape to form an axial spring seal and the spraying is to axial end surfaces of the substrate; or
the substrate has shape to form a finger seal and the spraying is to a contact surface of the substrate; or
the substrate has shape to form a radial spring seal and the spraying is to radial end surfaces of the substrate; or
the substrate has shape to form a HALO seal and the spraying is to an inner diameter surface of the substrate; or
the substrate has shape to form a locating pin and the spraying is to a base of the locating pin or a distal end section of the locating pin; or
the substrate interfaces with a locating pin and the spraying is to a counterface surface for the locating pin; or
the substrate has shape to form a snap fastener and the spraying is to a shaft and a barb underside; or
the substrate has shape to form a component having a snap fit bead or groove and the spraying is to said bead or groove; or
the substrate has shape to form a component having a tab and the spraying is to a face of the tab; or
the substrate has shape to form a component having a seal counterface and the spraying is to the seal counterface.

* * * * *